United States Patent [19]

Howe et al.

[11] Patent Number: 5,776,520

[45] Date of Patent: Jul. 7, 1998

[54] SHELL MOLDED ARTICLE STRIPPING MACHINE

[75] Inventors: William L. Howe, Canal Fulton; John M. Alexander, Tallmadge, both of Ohio

[73] Assignee: ACC Automation Company, Akron, Ohio

[21] Appl. No.: 763,936

[22] Filed: Dec. 12, 1996

[51] Int. Cl.⁶ .................... B29C 41/14; B29C 41/42
[52] U.S. Cl. .................. 425/274; 425/437; 425/438
[58] Field of Search .................. 425/274, 272, 425/437, 438

[56] References Cited

U.S. PATENT DOCUMENTS

| | | | |
|---|---|---|---|
| 1,154,191 | 9/1915 | Mahoney | 425/393 |
| 1,220,177 | 3/1917 | Brubaker | 425/274 |
| 1,330,595 | 2/1920 | Lerch | 264/335 |
| 1,483,664 | 2/1924 | Kempel | 425/274 |
| 1,658,011 | 1/1928 | Unger | 15/88.3 |
| 1,923,733 | 8/1933 | Killian | 264/335 |
| 2,021,299 | 11/1935 | Gammeter | 264/303 |
| 2,116,916 | 5/1938 | Van Hyning | 264/334 |
| 2,482,418 | 9/1949 | Jenkins | 264/304 |
| 2,508,204 | 5/1950 | Weber et al. | 425/437 |
| 2,628,387 | 2/1953 | Landau | 264/335 |
| 3,013,302 | 12/1961 | Croxton | 264/303 |
| 3,166,791 | 1/1965 | Miller et al. | 425/160 |
| 3,176,059 | 3/1965 | Cremer | 264/335 |
| 3,304,576 | 2/1967 | Keesling et al. | 425/274 |
| 3,309,732 | 3/1967 | Cremer | 425/437 |
| 3,369,271 | 2/1968 | Rodrigues et al. | 425/438 |
| 3,570,053 | 3/1971 | Rodrigues et al. | 425/274 |
| 3,655,317 | 4/1972 | Funkhouser et al. | 425/274 |
| 3,843,296 | 10/1974 | Sidley | 425/270 |
| 4,449,911 | 5/1984 | Brasfiel | 425/274 |
| 4,957,059 | 9/1990 | Daughenbaugh | 425/270 |
| 4,993,935 | 2/1991 | Stevanovich | 425/274 |
| 5,129,810 | 7/1992 | Nakagaki | 425/437 |

FOREIGN PATENT DOCUMENTS

| | | | |
|---|---|---|---|
| 1087345 | 8/1960 | Germany | 425/274 |

Primary Examiner—Robert Davis
Attorney, Agent, or Firm—Pearne, Gordon, McCoy and Granger LLP

[57] ABSTRACT

An automatic glove stripping machine is disclosed comprising a drive unit that distributes power to one or more stripping assemblies, each comprising a conveyor unit, a plurality of dipping molds, a pressurized air distribution system, a brush set, a plurality of grip assemblies, and a cam assembly. Each grip assembly is moved into engagement with a set of dipping molds retaining dip molded articles such as latex gloves. As each grip assembly and corresponding set of dipping molds travel over the stripping assembly, the molded articles on the dipping molds are partially removed by action of the grip assembly and a stream of pressurized air directed at each mold. As the set of dipping molds reaches the end of the stripping assembly, the molded articles are completely removed from their dipping molds by the brush set.

17 Claims, 18 Drawing Sheets

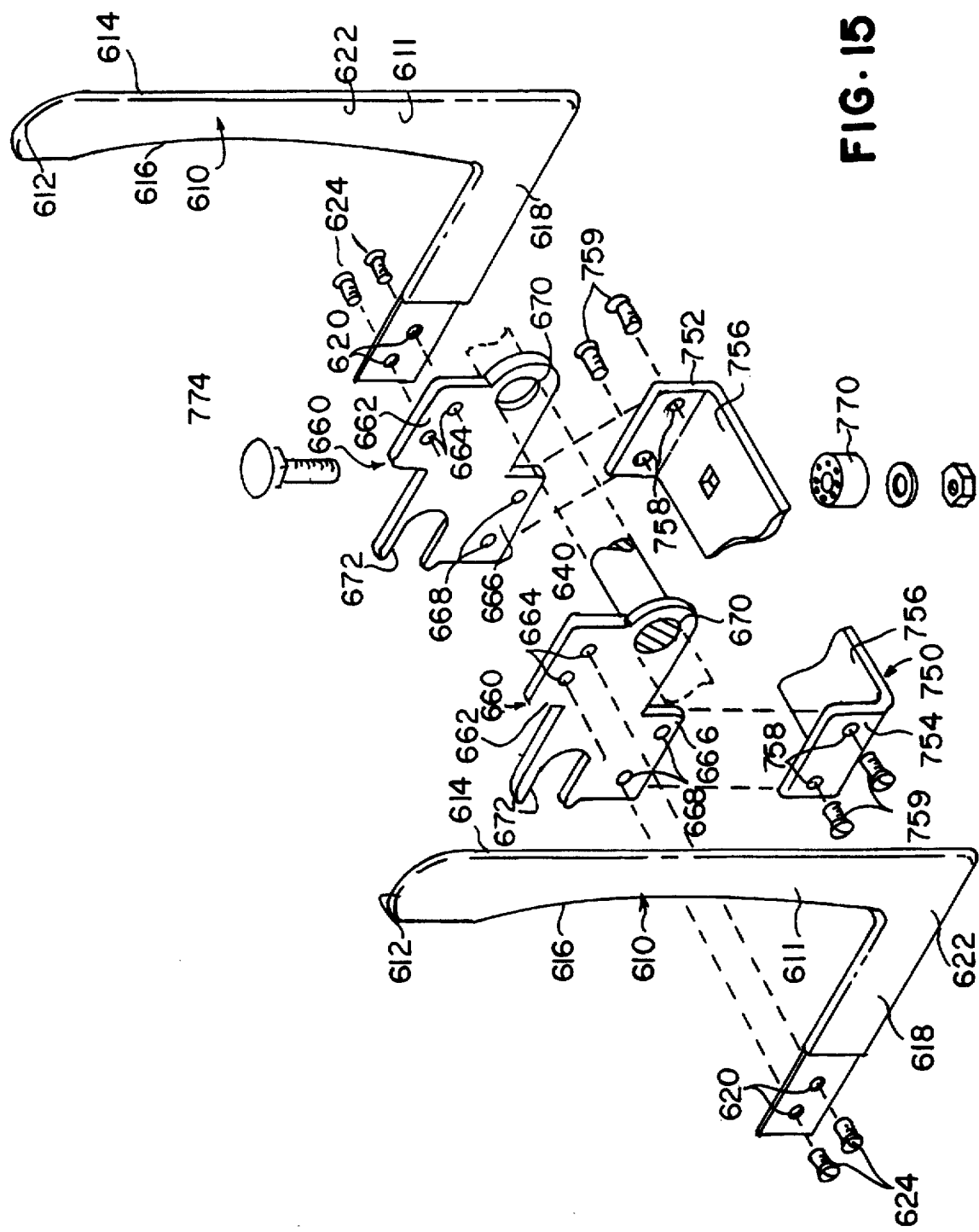

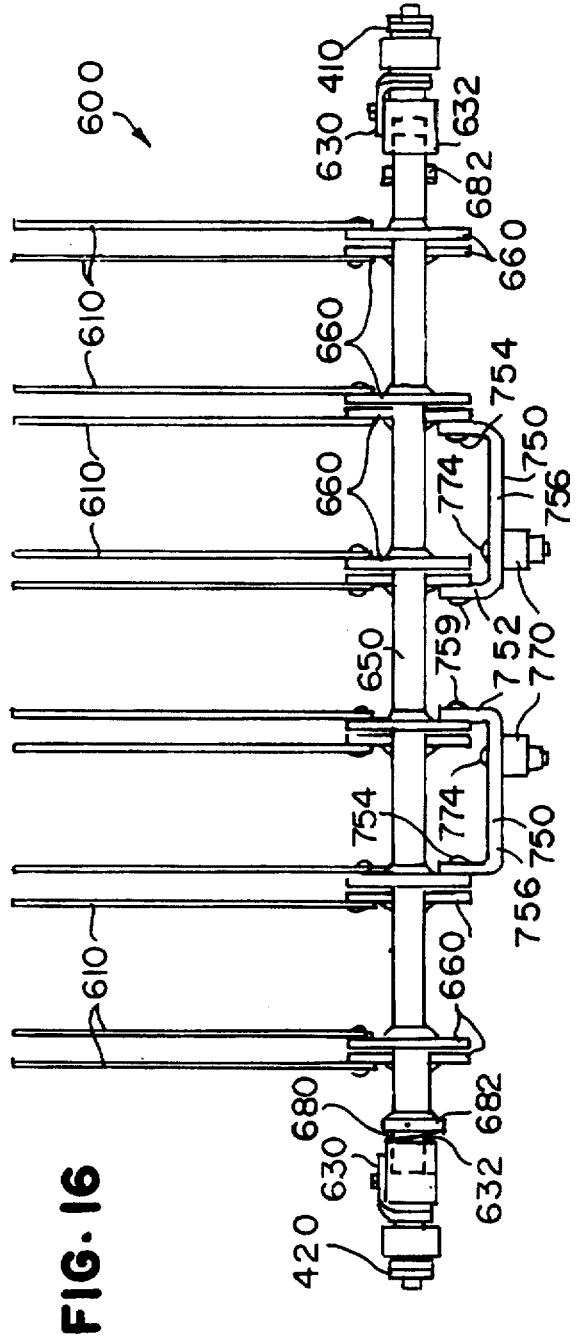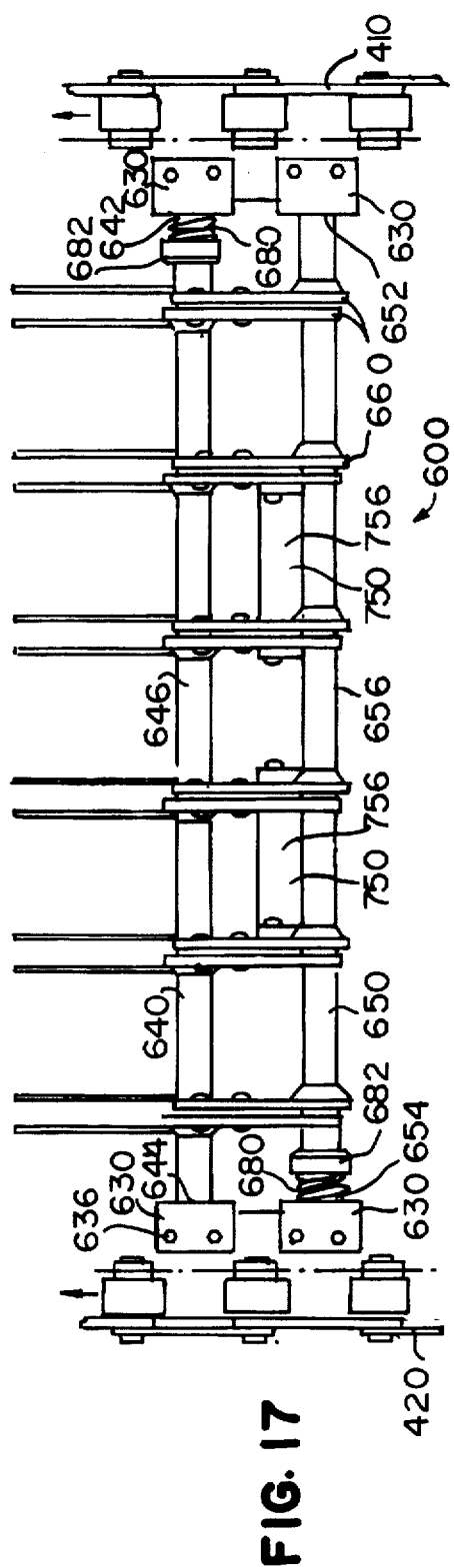

FIG·19

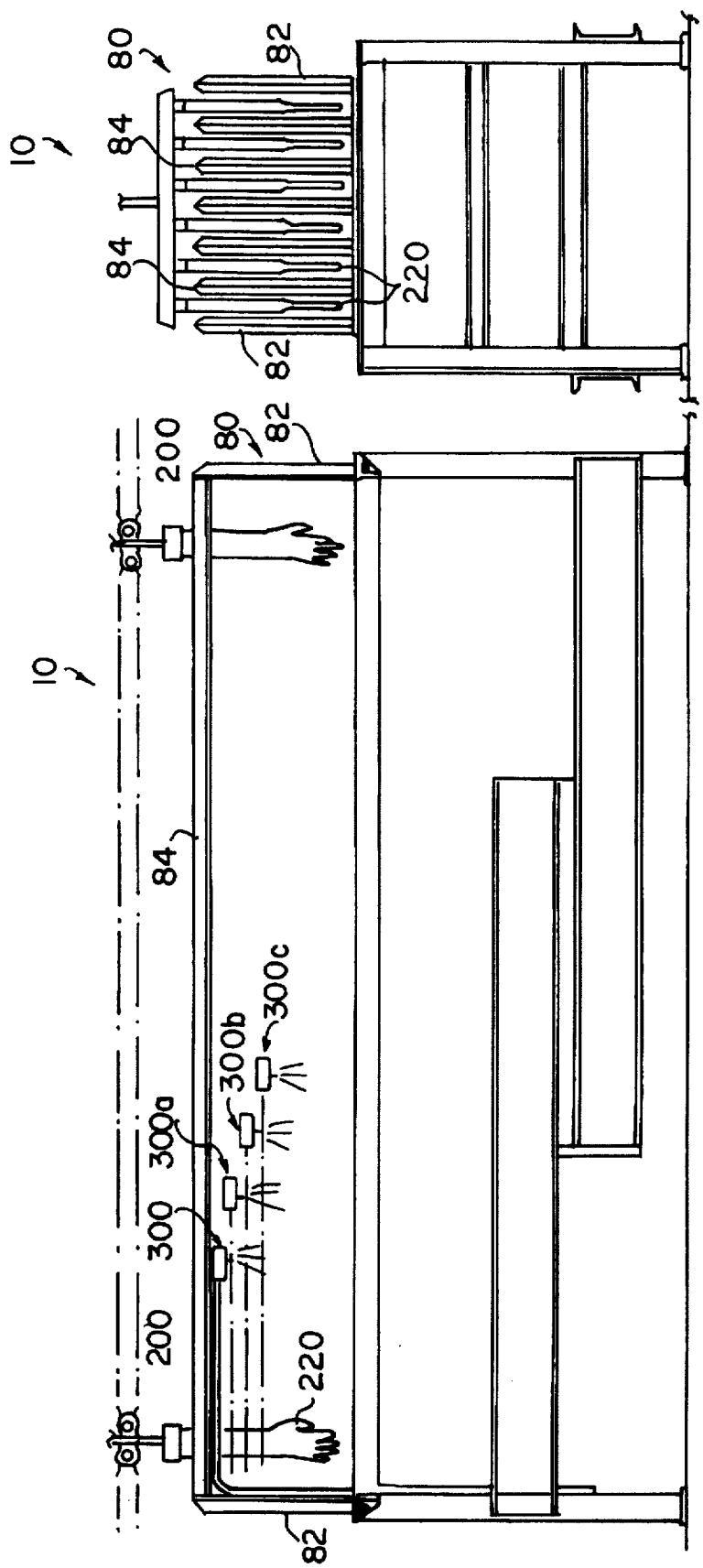

5,776,520

SHELL MOLDED ARTICLE STRIPPING MACHINE

FIELD OF THE INVENTION

The present invention relates to a device that automatically removes molded articles from a mold, such as latex gloves from a dipping mold, at a high rate and with minimal or no damage occurring to the articles.

BACKGROUND OF THE INVENTION

Shell molding is a process by which articles are molded upon a male form. Typically, shell molding involves dipping the male form into a tank of liquid molding material. The material adheres to the outer surface of the male form, and upon curing or otherwise solidifying, produces an article having a shape and size corresponding to the male form.

As will be appreciated, it is often difficult to remove the molded articles from the male forms. If the molded articles are formed to have a relatively thin wall such as surgical gloves, they are particularly prone to rupturing or tearing during removal from the male forms.

Machines are known for removing shell molded articles from a male form. However, such machines frequently apply excessive stress to the molded articles often leading to unacceptable levels of damage to the articles. Furthermore, such machines are relatively slow and so undesirable for use in a high rate commercial manufacturing process. Thus, there is a need for a machine that quickly and efficiently removes shell molded articles from a male form, with little or no damage occurring to the articles.

SUMMARY OF THE INVENTION

The present invention achieves all of the foregoing objectives and provides an apparatus for removing a shell molded article from a molding form. The apparatus comprises a conveyor, a plurality of grip assemblies that are moved from one end of the conveyor to the other, a drive unit that supplies rotary power to the conveyor and moves one or more molding forms generally above and across the conveyor, and a cam assembly that operates the grip assemblies along a particular region of the conveyor to remove the shell molded articles from the molding forms.

The invention also provides a method of removing a shell molded article from a form by use of the above-noted apparatus. In particular, the method involves bringing a pair of grip assemblies into contact with the molded article while on the form, directing a stream of pressurized air at the end of the article on the form, and pulling the pair of grips away from the form to remove, or partially remove the article. A brush set may be utilized to assist in removing the article from the molding form.

BRIEF DESCRIPTION OF THE DRAWINGS

FIG. 15 is a partially exploded perspective view of a pair of grips utilized in the grip assembly of the preferred embodiment glove stripping machine;

FIG. 16 illustrates in greater detail the grip assembly utilized in the preferred embodiment glove stripping machine;

FIG. 17 is a plan view further detailing aspects of the grip assembly shown in FIG. 16;

FIG. 21 is a side elevational view of the preferred embodiment glove stripping machine comprising an optional divider frame assembly and supplemental pressurized air distribution systems; and FIG. 22 is an end view of the preferred embodiment glove stripping machine depicted in FIG. 21.

DESCRIPTION OF THE PREFERRED EMBODIMENTS

Figure 1:
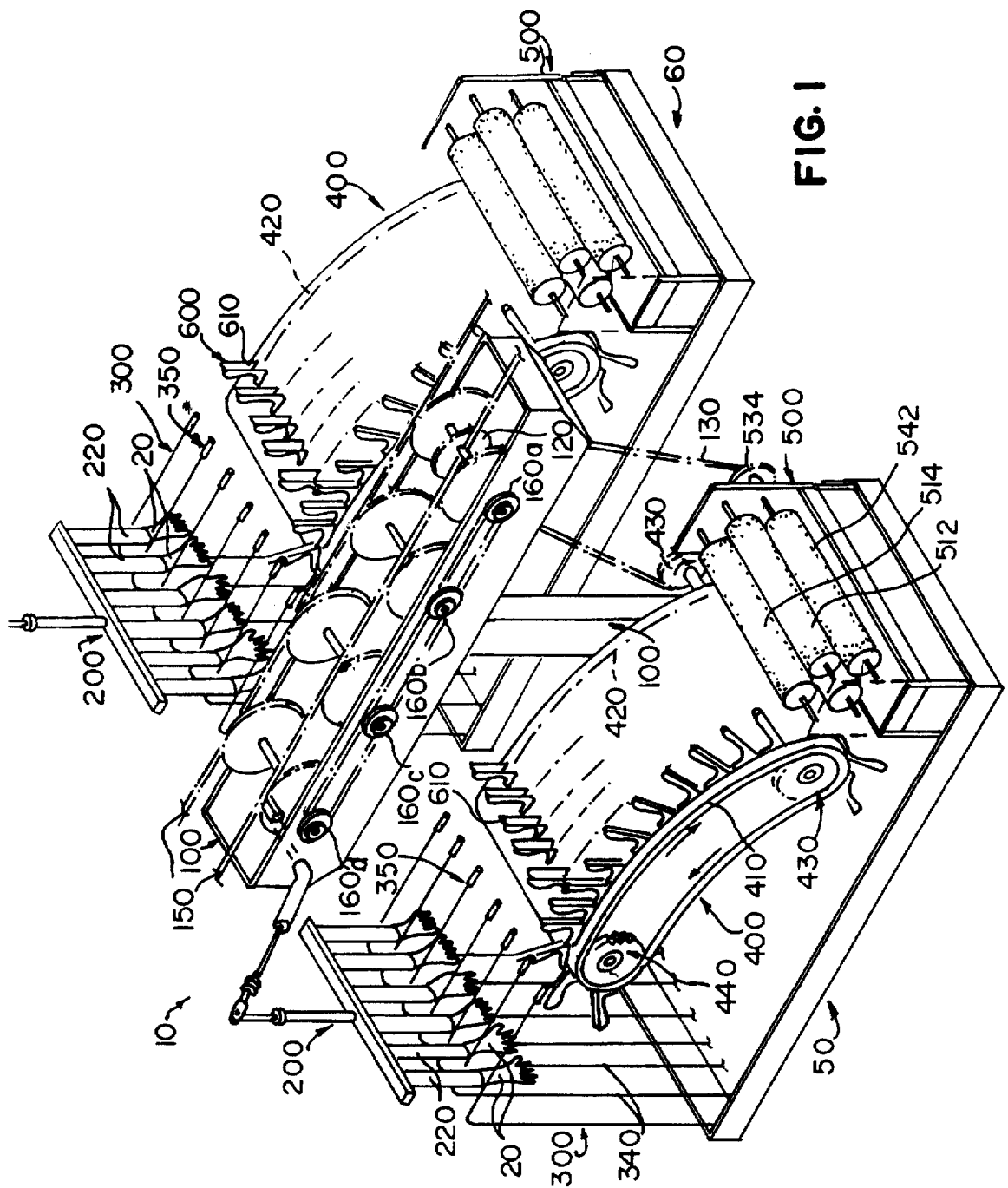
FIG. 1 is a partially exploded perspective view of a preferred embodiment automatic glove stripping machine in accordance with the present invention.

A preferred embodiment automatic glove stripping machine 10 in accordance with the present invention is illustrated in the accompanying figures. Referring to FIGS. 1-4, the preferred embodiment glove stripping machine 10 comprises a drive assembly 100, a first stripping assembly 50, and a second stripping assembly 60. Each stripping assembly 50 and 60 comprises a plurality of forming assemblies 200, a pressurized air distribution system 300, a conveyor unit 400, a brush set 500, a plurality of grip assemblies 600, and a cam assembly 700. Before describing the particular components of the glove stripping machine 10, it is to be understood that the drive assembly 100 may be utilized with one or more stripping assemblies. That is, the present invention stripping machine is not limited to the use of a pair of stripping assemblies, such as assemblies 50 and 60, each disposed on a side of a single drive unit 100 as shown in the accompanying figures. Instead, it is entirely within the scope of the present invention to provide a stripping machine comprising a single drive unit and a single stripping assembly, or multiple stripping assemblies on either or both sides of the drive unit. Furthermore, it is to be understood that although the present invention is primarily described in terms of a glove stripping machine, the present invention also provides devices for removing other types of molded articles from their forming molds. References to the "rear" of the machine 10 generally refer to the region proximate to and including the brush set 500. References to the "front" of the machine 10 generally refer to the region of the machine 10 opposite the previously noted rear end.

The drive assembly 100 shown in the noted figures is adapted for distributing power from one or more master drive chains 150, such as typically provided in manufacturing or assembly facilities, to one or more stripping units such as 50 and 60 forming the preferred embodiment glove stripping machine 10. Referring to FIGS. 1, 3, 5, and 6, the drive assembly 100 comprises one or more upwardly extending frame members 102 affixed to and supported by a base 104. One or more panels 106 are preferably disposed about the upper portion of the drive assembly 100 to enclose the drive mechanism described in greater detail below.

Figure 5:
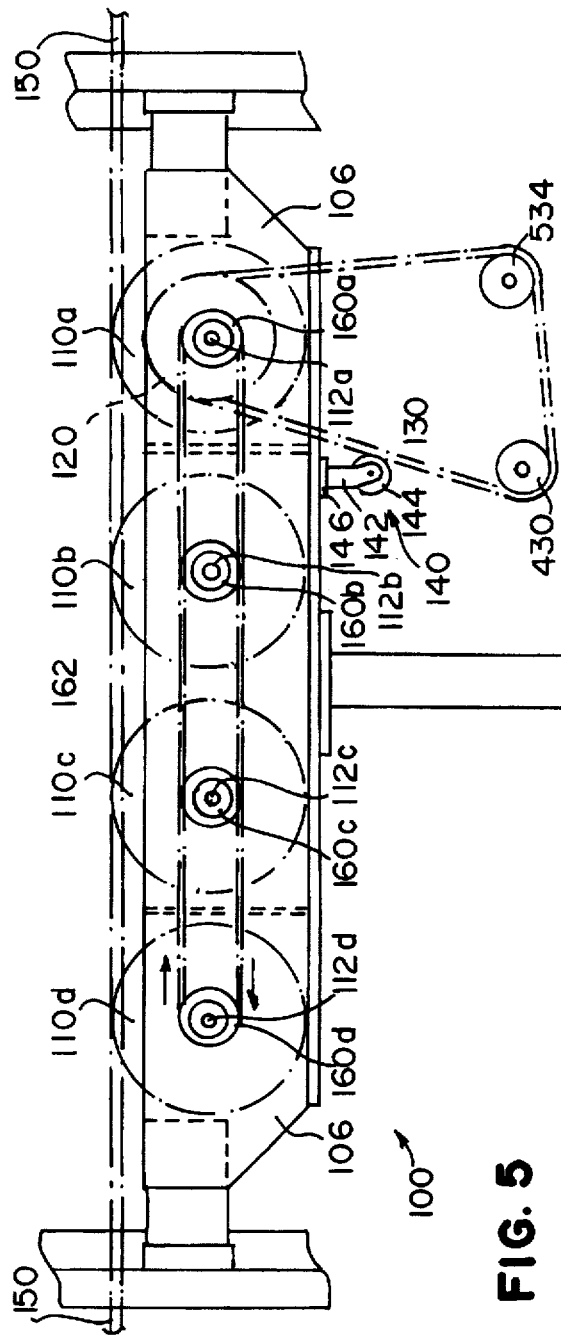
FIG. 5 is a side elevational view of a drive assembly utilized in the preferred embodiment glove stripping machine.
Figure 6:
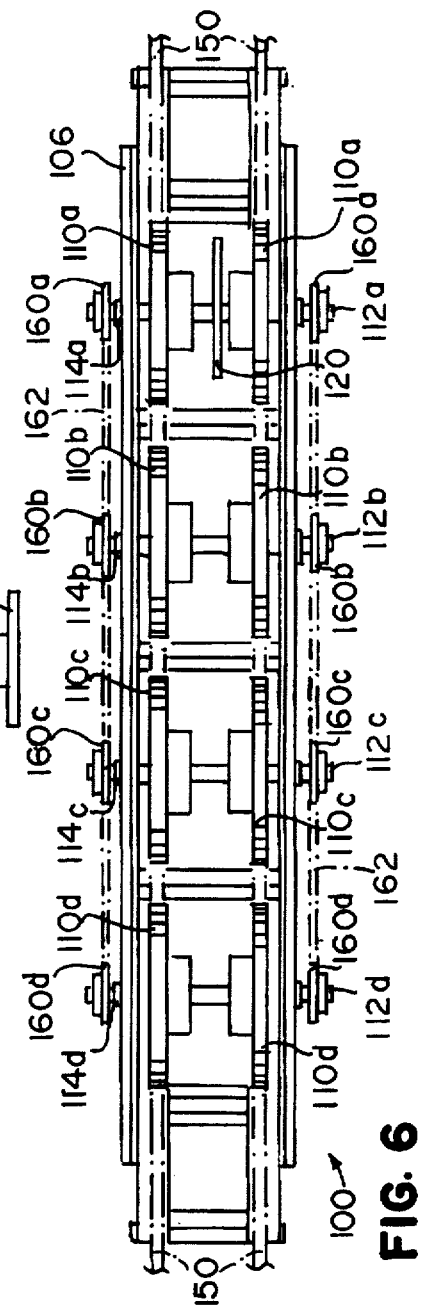
FIG. 6 is a plan view of the drive assembly illustrated in FIG. 5.

As best shown in FIGS. 5 and 6, the drive assembly 100 further comprises, typically supported by the frame members 102 and the base 104 and disposed within the panels 106, a plurality of primary sprockets 110. The drive assembly 100 preferably comprises four pairs of primary sprockets, 110a, 110b, 110c, and 110d. The sprockets are aligned in one or more rows and are in operable engagement with the master drive chains 150 as illustrated. Each sprocket 110 is rotatably supported by a corresponding shaft 112 and a respective set of bearings 114. That is, the primary sprockets 110a are supported by a corresponding shaft 112a and at least one bearing 114a. Similarly, the primary sprockets 110b are supported by a corresponding shaft 112b and at least one bearing 114b. Shafts 112c and 112d and bearings 114c and 114d are also provided. Preferably mounted on or at least in operable engagement with the shaft 112a, is a secondary sprocket 120 described below.

The drive assembly 100 further comprises a plurality of supplemental sprockets 160, and one or more chains 162 extending between two or more of the sprockets 160. As shown in FIGS. 5 and 6, the sprockets 160 and accompanying chains 162 are preferably located along the exterior of the panels 106. The supplemental sprockets 160 are in operable engagement with the primary sprockets 110. The axes of rotation of a pair of sprockets 160 and a corresponding pair of primary sprockets 110 are preferably coextensive with one another. The sprockets 160 are preferably mounted upon the previously noted shafts 112 that support the sprockets 110. Accordingly, shaft 112b for instance, comprises the following sprockets keyed, affixed, or otherwise engaged with it: a first sprocket 160b disposed along an exterior face of a first panel 106, a first primary sprocket 110b located along an interior face of the first panel 106, a second primary sprocket 110b located along an interior face of a second panel 106, and a second sprocket 160b disposed along an exterior face of the second panel 106. All of the sprockets 160 on the same side of a panel 106 are aligned with each other in a row as shown in FIG. 6. The supplemental sprockets 160 and accompanying chains 162 serve to smooth the delivery of power from the master drive chains 150 to the various components of the machine 10, described in greater detail below.

The drive assembly 100 serves as a power distribution unit running off one or more master drive chains 150. Each linearly moving master drive chain 150 engages one or more of the primary sprockets 110, and most preferably engages all of the primary sprockets 110a, 110b, 110c, and 110d thereby causing rotation of each of those sprockets 110. As shown in FIGS. 5 and 6, the shaft 112a at the rear of the drive assembly 100 further comprises the secondary sprocket 120 that is keyed or otherwise affixed to the shaft 112a. Preferably, the secondary sprocket 120 is located at the midpoint of the length of the shaft 112a. Upon rotation of the shaft 112a, resulting from rotation of the primary sprockets 110a, the secondary sprocket 120 is also rotated. The secondary sprocket is in operable engagement with a component drive chain 130 that, as described in greater detail below, provides power to one or more conveyor units 400 via sprockets 430, and one or more brush sets 500 through sprockets 534. It is to be understood that although the drive unit 100 is illustrated and described as comprising a total of eight primary sprockets 110, a greater or lesser number can be utilized. Similarly, a greater or lesser number of supplemental sprockets 160 could be employed. And, a greater or lesser number of secondary sprockets 120 could be utilized.

Referring to FIG. 5, it is preferred to provide a tensioner assembly 140 in engagement with the component drive chain 130 to maintain proper tension on the drive chain 130. The tensioner assembly 140 preferably comprises a tensioner assembly support member 146 that typically is mounted upon the drive assembly 100 or panels 106, a biasing member 142 extending from the support member 146, and a rotatable tensioner sprocket 144. The tensioner sprocket 144 is in engagement with the drive chain 130 and exerts a tension maintaining force upon the drive chain 130. The biasing member 142 is preferably pivotally mounted from the support member 146 and urged outward in a biasing direction to thereby cause the tensioner sprocket 144 to displace the drive chain 130 and maintain its proper tension. The tension maintaining force exerted upon the biasing member 142 is preferably adjustable and provided by a spring.

Figure 3:
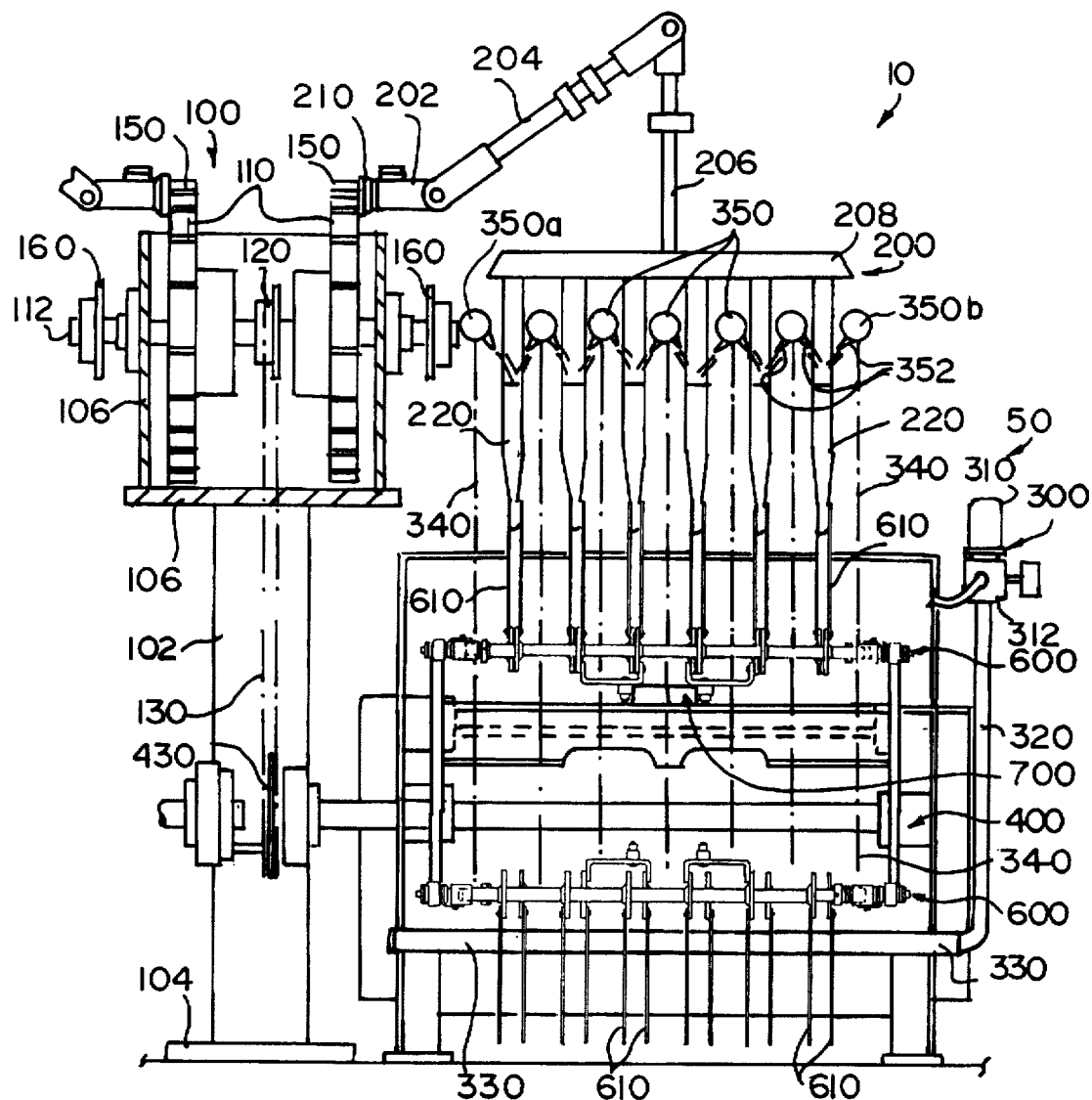
FIG. 3 is a front elevational view of the preferred embodiment glove stripping machine.

Referring to FIGS. 1 and 3, the forming assembly 200 of a stripping assembly 50, 60 comprises a support member 202 that is engageable with a carried member 210 on the master drive chain 150. The forming assembly 200 serves as a transport mechanism to move a plurality of molds or forms 220 generally above and across a conveyor unit 400. Projecting from the support member 202 is an extension arm 204 and pivotally connected and extending therefrom is a connecting member 206. A generally horizontal mounting header 208 is provided at the distal end of the connecting member 206. The mounting header 208 preferably has a length sufficient for it to extend across the width of a conveyor unit 400. A plurality of forms 220, such as dipping or shell molds, are hung or otherwise secured underneath the mounting header 208. It is most preferred that the forms 220 be rigidly affixed to the mounting header 208. The forms 220 typically have the shell molded articles, such as molded gloves 20, residing on them.

The support member 202 is engaged with the carried member 210 such that the forming assembly 200 is carried along and moves with the master drive chain 150. Conventional adjustment provisions are provided at the desired locations of the forming assembly 200 so that the mounting header 208 can be selectively positioned both vertically and horizontally with respect to the conveyor unit 400 disposed beneath. Similarly, adjustment provisions can also be provided between the mounting header 208 and the forms 220 extending downward therefrom.

Figure 20:
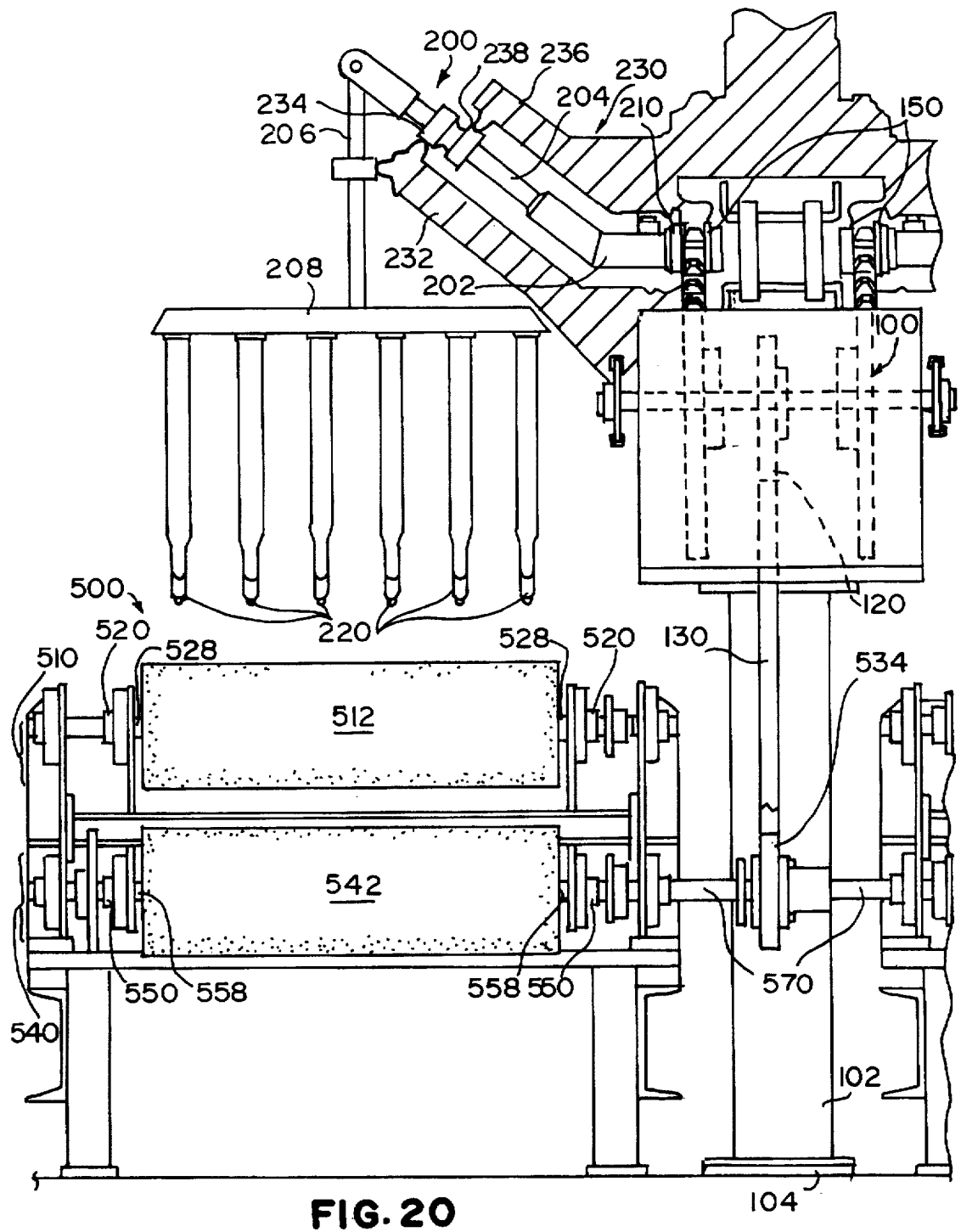
FIG. 20 is a rear elevational view of the brush assembly illustrated in FIG. 19.

Support provisions may be included for the forming assembly 200 so that excessive torque and stress are not applied to the carried member 210. For example, an overhead sliding track may be provided along which the forming assemblies 200 travel as they are carried with the drive chains 150. An example of an overhead sliding track is shown in FIG. 20. That track, designated as track 230, preferably comprises a lower support member 232 providing a lower bearing surface 234, and an upper support member 236 providing an upper bearing surface 238. Other configurations and assemblies may be used for slidably supporting the forming assemblies 200.

The number of forms 220 provided along the length of the mounting header 208 depends upon the production rate of the molding operation, and so the demand rate for the stripping machine. The preferred embodiment machine 10 shown in the accompanying drawings comprises a total of six forms 220 equally spaced along the length of the header 208 for each conveyor unit 400 on each side of the drive assembly 100. However, it is clearly within the scope of the present invention to utilize rows of forms 220 of one to ten units wide. Configurations of eleven or more forms 220 can also be utilized, although it may be necessary to increase the width of the mounting header 208, the conveyor unit 400, and associated components.

As best illustrated in FIGS. 1 and 3, the pressurized air distribution system 300 of a stripping assembly 50, 60 comprises a pressure regulator 310 disposed upon a mounting base 312, a manifold delivery tube 320, a distribution manifold 330, a plurality of air conduits 340 extending from the manifold 330, and a plurality of nozzle blocks 350 and nozzle blowoffs 352 located at the distal ends of the air conduits 340, all of which are described below. Instrument air from the plant or facility is supplied to the pressure regulator 310. As can be seen in the noted figures, air passing from the pressure regulator 310 is directed through the manifold tube 320 and flows to the distribution manifold 330. The distribution manifold 330 is preferably disposed at the lower front region of the stripping assembly 50, 60. The manifold 330 distributes air to the plurality of air conduits 340 that serve as distribution branches thereby delivering the air to the plurality of nozzle blocks 350. Each air conduit 340 preferably has a vertical portion extending upward from the distribution manifold 330 and a horizontal portion extending over the front end of the conveyor unit 400. At a location above the conveyor unit 400, each air conduit 340 terminates at a corresponding nozzle block 350. The nozzle blocks 350 are stationary, and so one or more support brackets or fasteners may be used to affix the blocks 350 and any of the conduits 340 to the frame of the stripping assembly 50, 60. Disposed at each nozzle block 350 are one or more nozzle blowoffs 352. Each nozzle blowoff 352 serves to direct pressurized air exiting the air conduit 340 and nozzle block 350. As explained below, the stream of pressurized air is used to facilitate removal of the molded articles, such as molded gloves 20, from the forms 220.

The nozzle blocks 350 are located below the mounting header 208 of a forming assembly 200, and above a conveyor unit 400. As seen in the accompanying drawings, the nozzle blocks 350 are all disposed the same distance from the conveyor 400 and in a single row generally perpendicular to the direction of travel of the master drive chain 150. Other configurations such as a staggered arrangement are contemplated.

The number of nozzle blocks 350 and thus air conduits 340 branching off from the manifold 330 depends upon the number of forms 220 affixed to the header 208 of the forming assembly 200. As noted, the preferred embodiment stripping machine 10 utilizes stripping assemblies 50 and 60, each having sufficient size and capacity for a six wide line. That is, the forming assemblies 200 being moved across and generally over each stripping assembly 50, 60, comprise rows of six forms 220. Thus, the number of air conduits 340 and nozzle blocks 350 that distribute air from the manifold 330 is preferably seven. The preferred number of nozzle blowoffs 352 for such an arrangement corresponding to a single stripping unit 50, 60, is twelve. It will be appreciated that the nozzle blocks 350 located on the ends of the row, such as nozzle blocks 350a and 350b illustrated in FIG. 3, are provided so that pressurized air may be directed to both sides of the forms 220 also on the ends of the row of forms.

The instrument air supply provided at the regulator 310 should have a supply capacity of at least about 200 SCFM. The regulator 310 is adjustable to provide a pressure at each nozzle blowoff 352 of from about 30 psig up to about 100 psig. Greater or lesser blowoff pressures may be utilized depending upon the end use requirements. Furthermore, one or more additional pressurized air distribution systems can be provided. Such additional systems would preferably be configured in parallel to the previously described system 300 and would provide an additional plurality of nozzles 350 and nozzle blowoffs 352. The additional sets of nozzle blowoffs 352 could be disposed downstream of the first set of nozzle blowoffs and would further assist or promote the removal of the molded articles from the forms 220. An example of such supplemental air distribution systems is illustrated in FIGS. 21 and 22, and described later herein.

Figure 2:
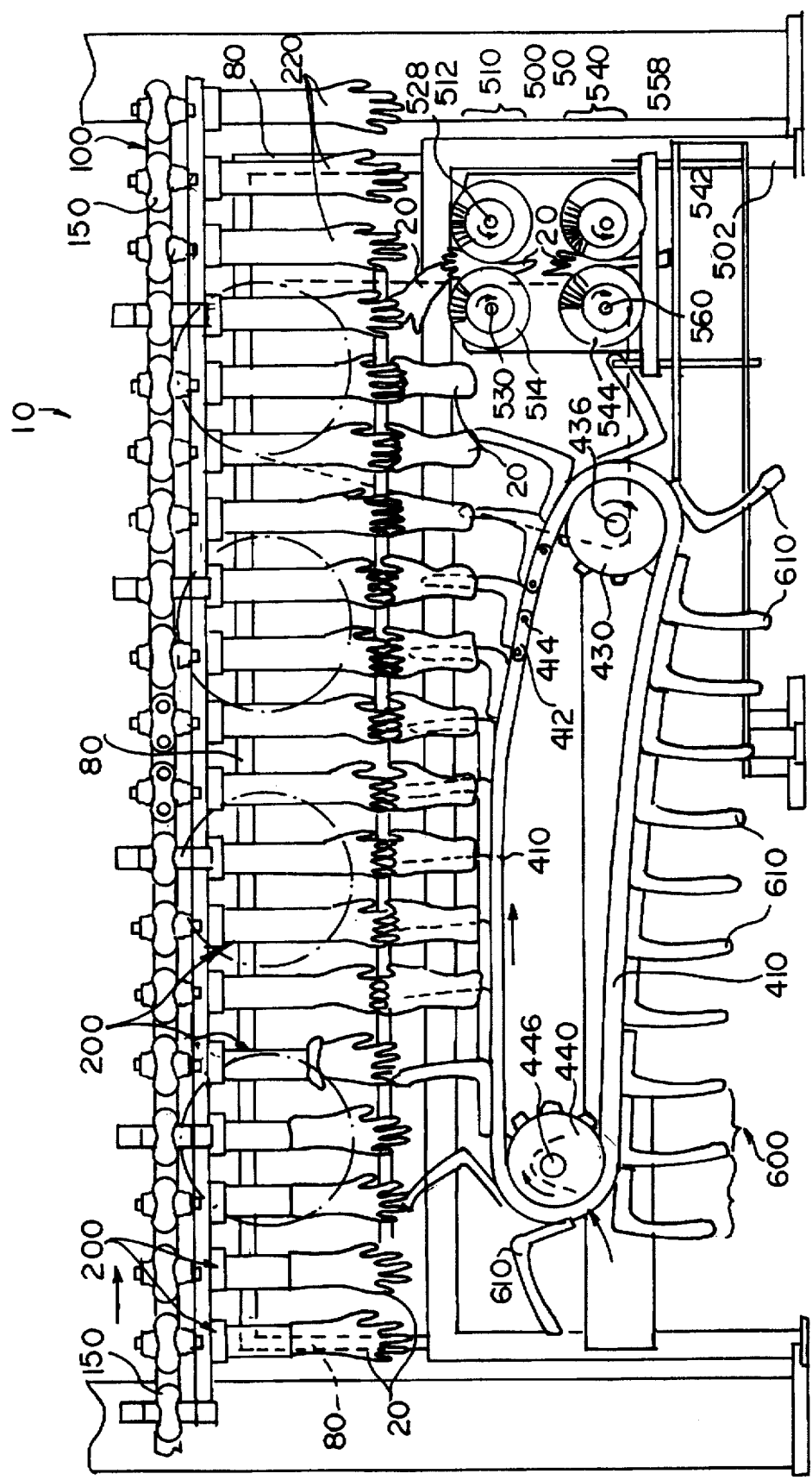
FIG. 2 is a side elevational view of the preferred embodiment glove stripping machine.
Figure 4:
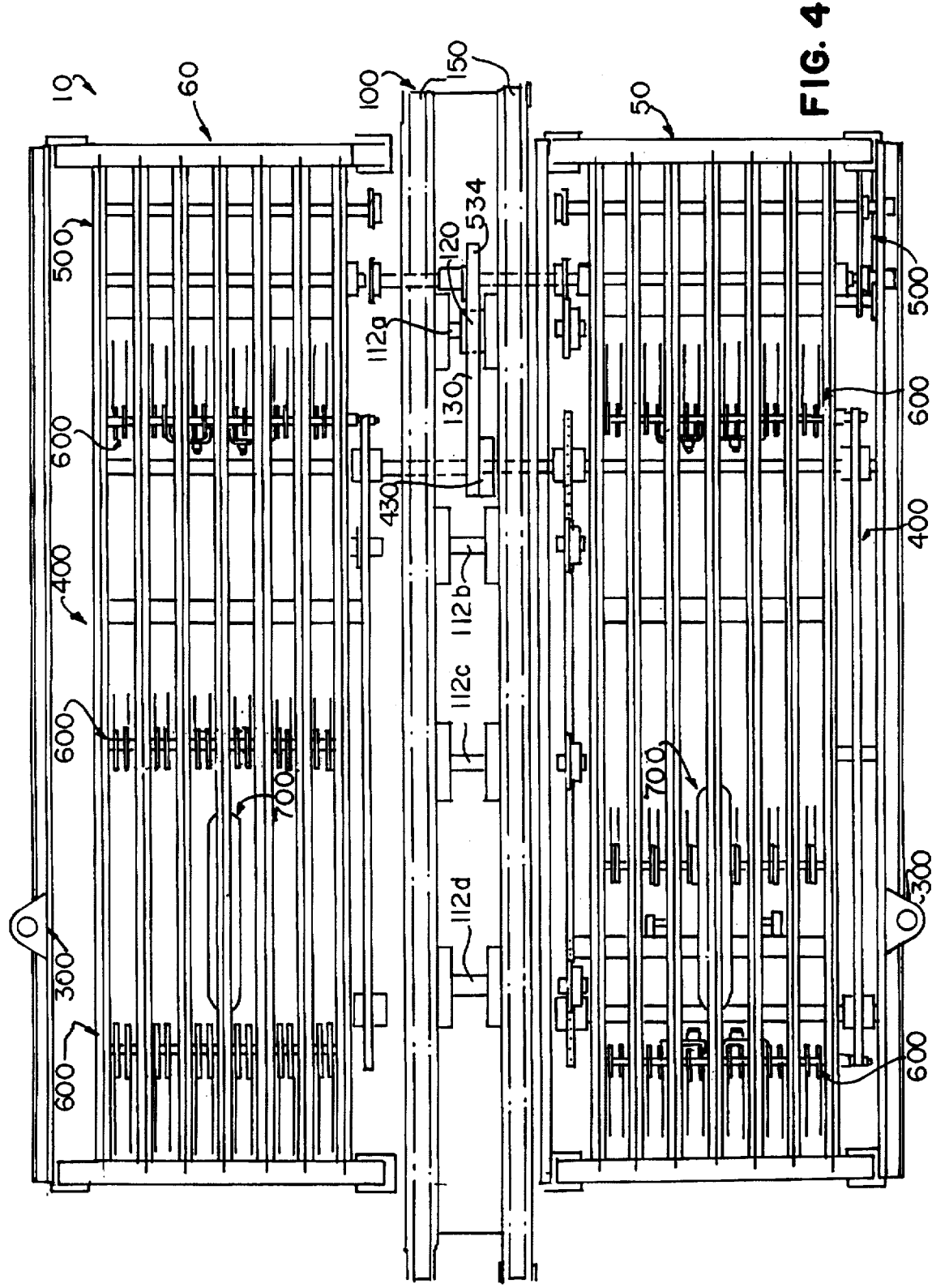
FIG. 4 is a plan view of the preferred embodiment glove stripping machine.

As evident in the accompanying drawings such as FIGS. 1, 2, and 4, each stripping assembly 50, 60 comprises a conveyor unit 400. The conveyor unit 400 is disposed on a side of the power distribution unit 100, and generally aligned such that its direction of travel is parallel with the master drive chains 150. The conveyor unit 400 functions to move a plurality of grip assemblies 600, each extending across the width of the conveyor, underneath and proximate with the previously described forming assemblies 200, that travel with the master drive chains 150. The conveyor unit 400 is operated such that the grip assemblies 600, each having a plurality of outwardly extending grips 610 described below, are moved from the front to the rear of the conveyor 400 along the upward face of the conveyor 400. Accordingly, the grip assemblies 600 are moved from the rear to the front of the conveyor 400 along the downward face of the conveyor 400.

Figure 7:
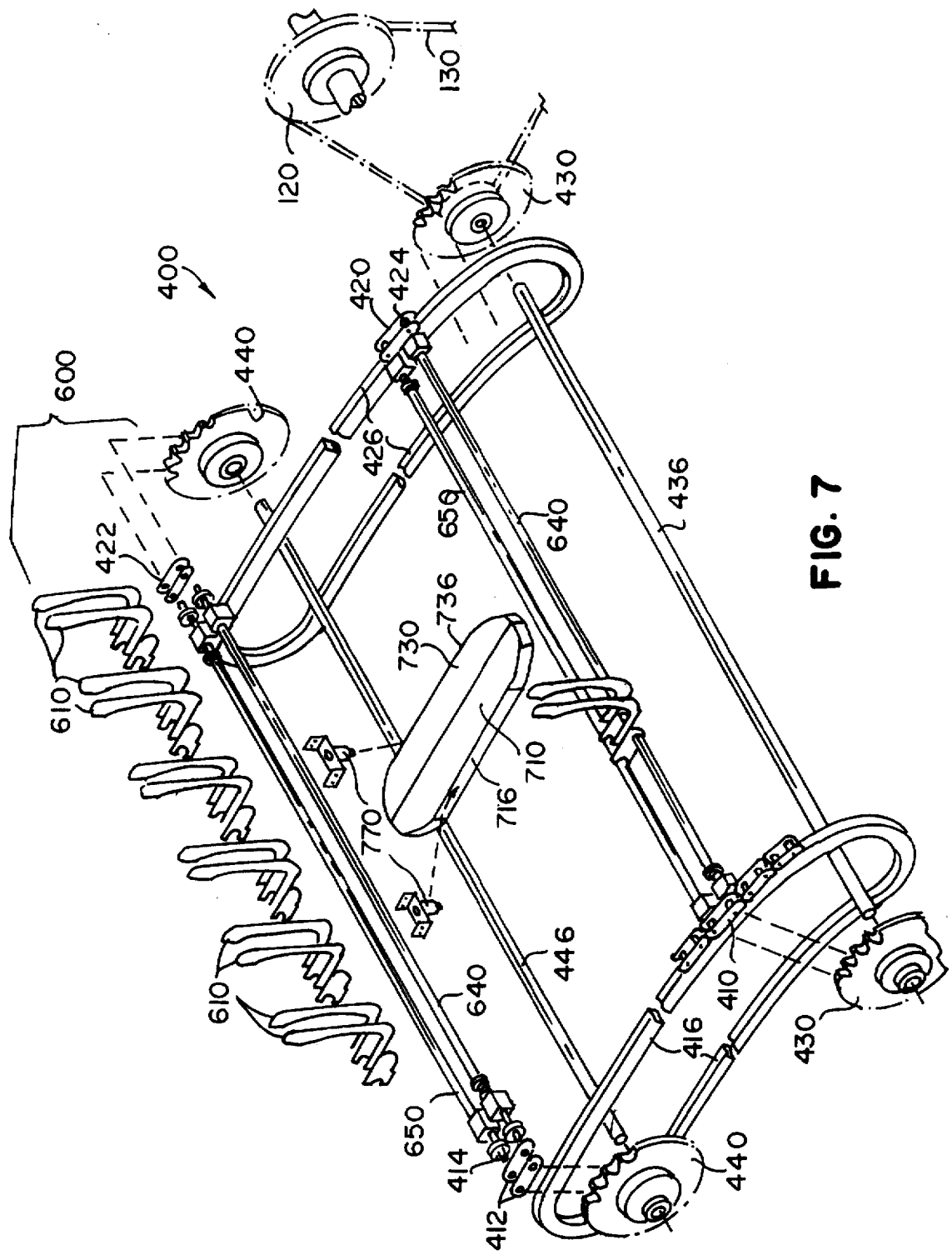
FIG. 7 is a partially exploded perspective view of a conveyor unit utilized in the preferred embodiment glove stripping machine.

Referring to FIGS. 1, 2, and 7, the conveyor unit 400 comprises one or more frame members which rotatably support a rear shaft 436 and a front shaft 446. The rear shaft 436 extends between a set of bearings and is in operable engagement with one or more rear sprockets 430 forming the conveyor unit 400. Similarly, the front shaft 446 extends between a set of bearings and is in operable engagement with one or more front sprockets 440 forming the conveyor unit 400. Extending between one rear sprocket 430 and one front sprocket 440, both sprockets being disposed on one side of the conveyor 400, is a first drive chain 410. The first drive chain 410 comprises a plurality of links 412 and a plurality of link posts 414 as known in the art. Extending around another rear sprocket 430 and another front sprocket 440, both sprockets being disposed on the other side of the conveyor 400, is a second drive chain 420 having a plurality of links and posts 422 and 424, respectively. The drive chains 410 and 420 are essentially closed loop flexible drive members. Guide tracks 416 and 426 are preferably provided to guide and support the drive chains 410 and 420. It is preferred that the guide tracks slidably retain the drive chains 410 and 420. These tracks 416 and 426 are described in greater detail below.

Extending between the drive chains 410 and 420 are a plurality of grip assemblies 600. The conveyor unit 400 serves to move the grip assemblies 600 along the upwardly directed face of the conveyor along with the plurality of forms 220 of a forming assembly 200 being moved over the length of the conveyor 400 by the drive chains 150. The speed of the conveyor 400 is such that a grip assembly 600 extending from an upwardly directed face of the conveyor moves at the same, or substantially the same, speed as the forming assembly 200 disposed above.

The conveyor unit 400 is powered by the previously noted component drive chain 130 in operable engagement with the drive unit 100. The drive chain 130, powered by the previously described assembly of sprockets 110a and 120 and the shaft 112a, is preferably in operable engagement with one or more of the conveyor sprockets 430 and 440, for instance, the rear sprocket 430 as shown in FIGS. 1 and 7.

Figure 8:
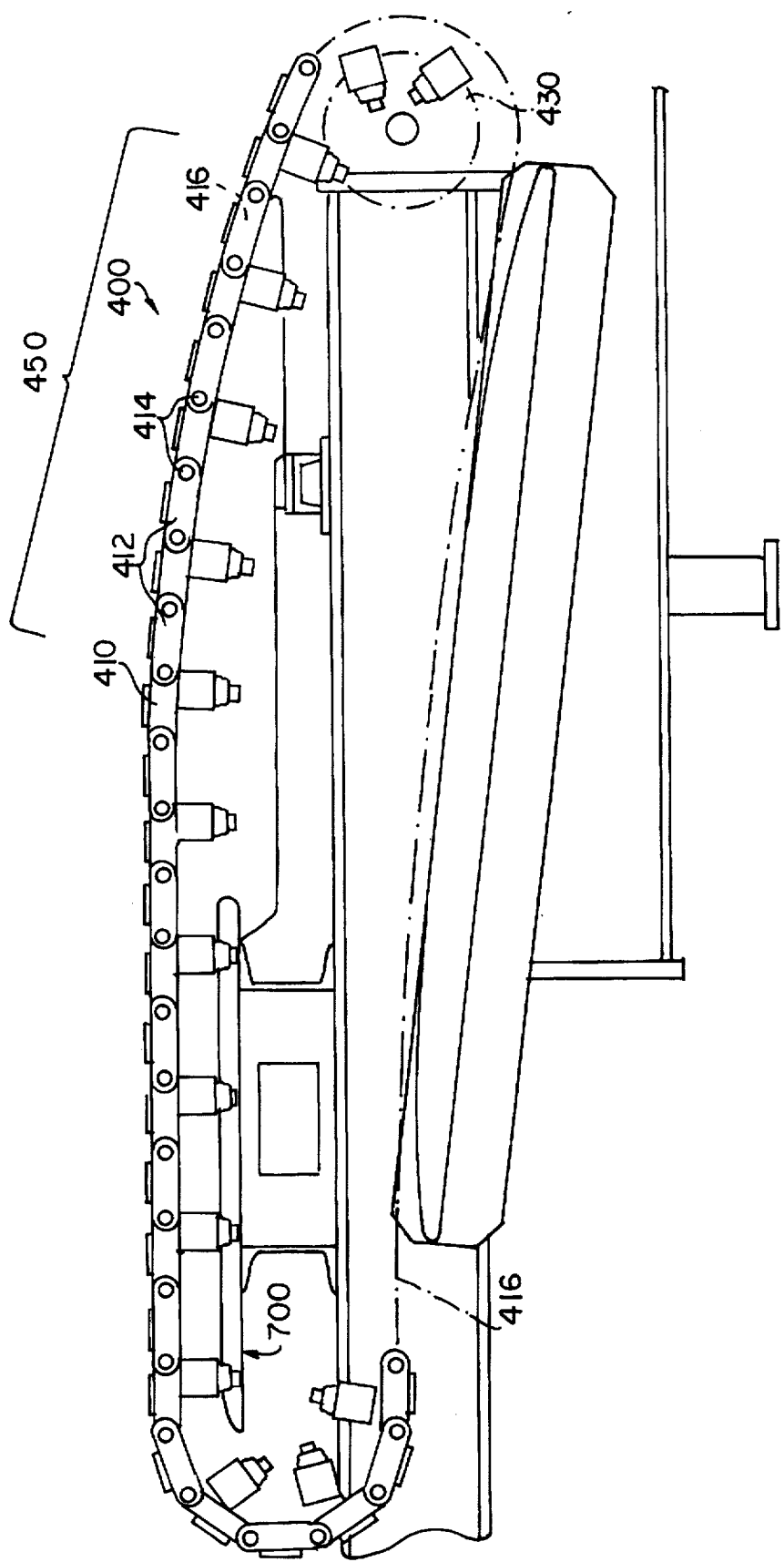
FIG. 8 is a side elevational view illustrating a cam assembly disposed within the conveyor unit utilized in the preferred embodiment glove stripping machine.

It will be noted that the conveyor 400 is oriented downward as it extends from the front end of the stripping assembly 50, 60 toward the rear end of the assembly, at which the brush set 500 is disposed. This is important for promoting removal of molded articles, such as gloves 20, from the forms 220 as explained below. Either the rearward portion of the conveyor can be directed downward, as shown in FIGS. 2, 7, and 8 or the entire conveyor 400 can be directed downward. The particular orientation depends upon the end use application. The guide tracks 416 and 426 are particularly useful for defining the configuration and geometry of the path the drive chains 410 and 420, and thus the gripping assemblies 600, travel. As illustrated in FIG. 8, the rearward portion of the guide tracks 416 and 426 is directed downward, and results in a gently sloping transition region 450 along the upward face of the conveyor 400. The particular importance of the transition region 450 is discussed in conjunction with the operation of the machine 10.

As noted, each stripping assembly 50, 60 comprises a brush assembly 500 located at the rear of the conveyor unit 400. Referring to FIGS. 1, 2, 19, and 20, the brush assembly 500 comprises one or more frame members 502 and enclosure panels 504. Each brush assembly 500 includes an upper brush pair 510 and a lower brush pair 540. The brushes are preferably oriented such that their axes of rotation are parallel with the conveyor shafts 436 and 446, and perpendicular to the direction of travel of the master drive chains 150. The upper brush pair 510 comprises a rearward brush 512 and a forward brush 514. The brushes are generally cylindrical, comprising a plurality of radially extending bristles. A wide array of brush types may be utilized, however a preferred brush size and type is a coil brush, 24 inch face with a diameter of 7.5 inches utilizing 6.6 nylon bristles, 4G channel, available from Precision Brush of Maple Heights, Ohio.

The forward brush 514 is driven or powered by a drive sprocket 518 rotatably supported by one or more bearings 522 in combination with a shaft 530. The rearward brush 512 is powered by a drive sprocket 516, rotatably supported by one or more bearings 520, and in operable engagement with a shaft 528. The lower brush pair 540 similarly comprise a forward brush 544 and a rearward brush 542. The forward brush 544 is driven by a drive sprocket 548 which is rotatably supported by one or more bearings 552 and a shaft 560 combination. The rearward brush 542 is powered by a drive sprocket 546 which is rotatably supported by one or more bearings 550 and a shaft 558.

The drive sprocket 548 for the lower forward brush 544 is preferably powered from a master drive shaft 570. The master drive shaft 570 is in operable engagement with, and rotated by, the component drive chain 130 via a drive sprocket 534. And so, the master drive shaft 570 is powered by the previously described secondary sprocket 120, which in turn is powered by the master drive chains 150. A drive belt or chain 580 is preferably provided between the upper forward brush 514 and the lower forward brush 544. The master drive shaft 570 is preferably in operable engagement with the shaft 560, and most preferably coextensive therewith. Upon rotation of the master drive shaft 570, the shaft 560 is rotated. Rotation of the shaft 560 effects rotation of the shaft 530 via the belt or chain 580.

The upper brushes 512 and 514 rotate in opposite directions as a result of their close proximity to each other. That is, the brushes contact one another along at least a portion of their length so that the distal ends of bristles from the brush 514 contact the distal ends of bristles from the brush 512. As noted in FIGS. 1, 2, and 19, when viewing the stripping assembly 50 or 60 from its left side, i.e. so that the front end of the assembly is at the viewer's left side and the rear end (at which the brush set 500 is located) is at the viewer's right side, the forward brush 514 rotates in a clockwise direction and the rearward brush 512 rotates in a counterclockwise direction. Similarly, the lower brushes 542 and 544 rotate in opposite directions as a result of their close proximity to each other. The forward brush 544 rotates in a clockwise direction and the rearward brush 542 rotates in a counterclockwise direction.

The brush set 500 is located at the rearward end of the conveyor 400 and positioned at a suitable height so that molded articles, such as gloves 20, hanging from the forms 220 traveling above the brush set 500, are passed across the upper brush pair 510. As explained in greater detail below, the opposingly rotating brushes 512 and 514 grab the hanging articles and pull them from the forms 220. The molded articles, now removed from the forms 220, are then directed to the lower brush pair 540, which further direct the molded articles to a collection container or transport line. A hopper or funnel-shaped chute 566 may be utilized to more accurately direct the molded articles exiting the upper brush pair 510, to the lower brush pair 540. For some applications, it may only be necessary to utilize one pair of brushes, or to utilize three or more pairs of brushes.

As noted, each conveyor unit 400 of the stripping assembly 50, 60, comprises a plurality of grip assemblies 600. The grip assembly 600, best shown in FIGS. 12, 16, and 17, comprises a plurality of outwardly extending grips 610 each mounted on a pair of grip bars 640 and 650 by a grip mount 660. Each grip bar 640 and 650 is affixed to the conveyor chains 410 and 420 by a grip bar carrier 630 as explained in greater detail below.

Referring to FIG. 15, each grip 610 preferably comprises a mounting arm segment 618, a transversely extending major portion 611 providing a leading edge 614 and a trailing edge 616 terminating at a distal end 612. The grip 610 preferably has an effective amount of a protective coating 622 deposited upon its outer surface. The protective coating 622 prevents or significantly minimizes slippage between the grip 610 and an article such as a glove 20 to be removed from a form 220. The coating 622 also protects the outer surface of the grip 610 and provides a smooth surface to minimize tearing of the molded article. One or more apertures 620 are defined at the end region of the mounting arm 618 for receiving a corresponding number of threaded fasteners 624 to affix a grip 610 to its corresponding grip mount 660. The grip mount 660 comprises an upper tab 662 having a plurality of apertures 664, and a lower tab 666 having a plurality of apertures 668. The grip mount 660 also provides a grip bar receptacle 670 and a grip bar receiving channel 672. Accordingly, in the grip assembly 600, the grip mounts 660 are engaged and retained along the lengths of the grip bars 640 and 650. The grip bar 650 is engaged within the receiving channel 672 of each grip mount 660 forming the grip assembly 600. Similarly, the grip bar 640 is engaged within the receptacle 670 of each grip mount 660 of the grip assembly 600.

Figure 12:
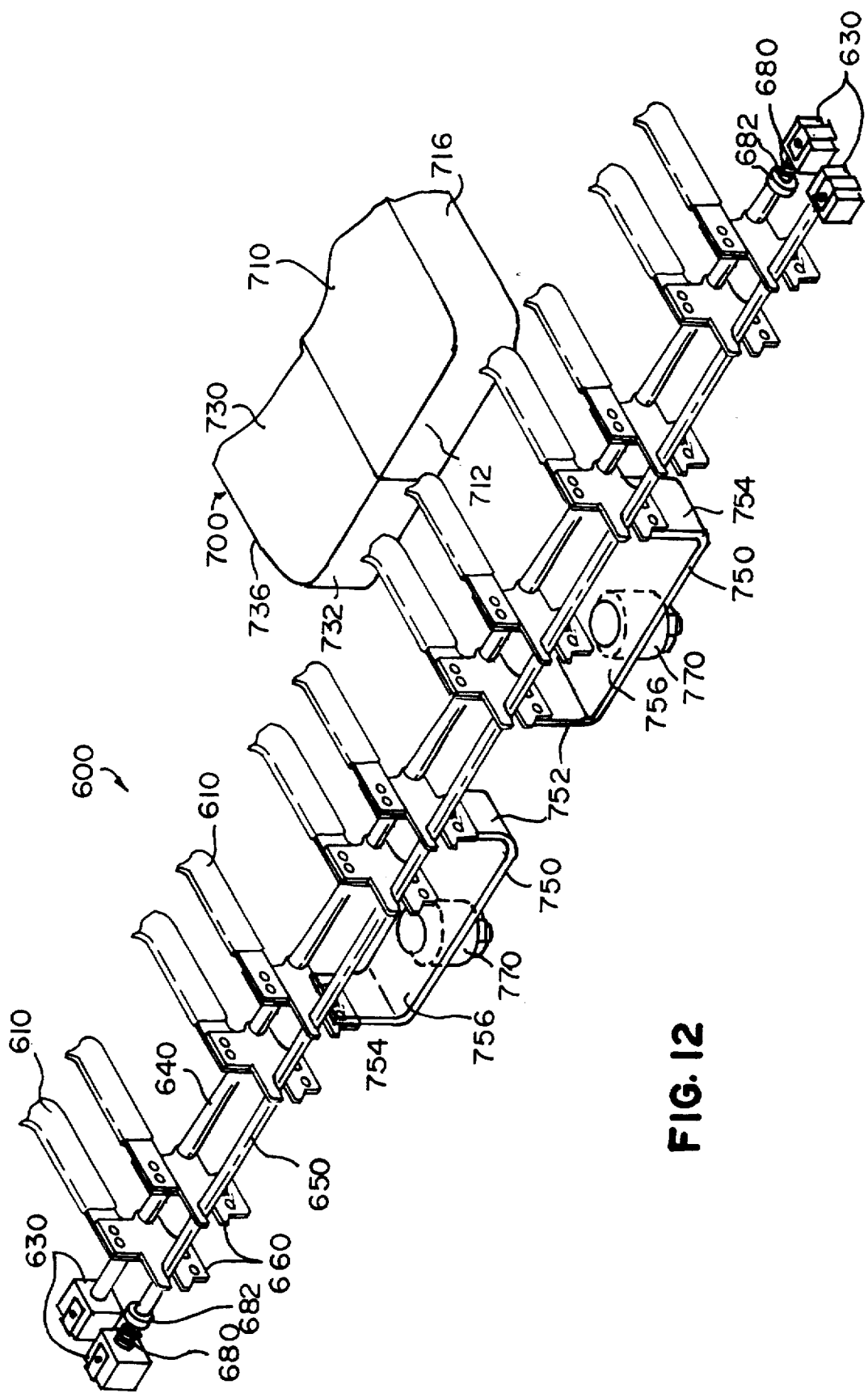
FIG. 12 is a partial perspective view of a grip assembly and its relationship with the cam assembly utilized in the preferred embodiment glove stripping machine.

Referring to FIGS. 12, 16, and 17, each grip assembly 600 comprises a first grip bar 640 and a second grip bar 650. The first grip bar 640 provides a first end 642, a second end 644, and an intermediate portion 646 extending between the ends 642 and 644. The second grip bar 650 likewise, provides a first end 652, a second end 654, and an intermediate portion 656 extending therebetween. A plurality of grip mounts 660 are preferably equally spaced along the length of both grip bars 640 and 650. Since the preferred embodiment machine 10 utilizes stripping assemblies adapted for processing rows of forms 220 that are six wide, each grip assembly preferably comprises six pairs of grips 610. Accordingly, each grip assembly 600 comprises twelve grips 610 and twelve grip mounts 660.

Each grip bar 640 and 650 is affixed to the conveyor chains 410 and 420 by a pair of grip bar carriers 630. Each grip bar carrier 630 has a receptacle 632 for receiving a first end 642 or 652, or a second end 644 or 654, of the first or second grip bar 640 or 650. Disposed at both the first end 642 of the first grip bar 640 and at the second end 654 of the second grip bar 650, or vice versa, i.e. the second end 644 of the first grip bar 640 and the first end 652 of the second grip bar 650, is a spring 680 and a retention collar 682. In the grip assembly 600, the springs 680 are normally in a state of compression. Accordingly, the spring 680 disposed at the second end 654 of the second grip bar 650, proximate the conveyor chain 420, urges the bar 650 toward the first end 652 proximate the conveyor chain 410. Similarly, the spring 680 disposed at the first end 642 of the first grip bar 640, proximate the conveyor chain 410, urges the bar 640 toward the second end 644 near the conveyor chain 420. As explained in greater detail below, the action of the springs 680 tends to separate adjacent grip mounts 660 from each other and thereby spread each pair of grips 610 apart.

As previously noted, each stripping assembly 50, 60 includes a cam assembly 700. As illustrated in FIGS. 4, 7–10 and 12–14, and as best shown in FIGS. 7 and 10, the cam assembly 700 comprises a first cam 710 and a second cam 730 typically mounted upon one or more support members 702 generally within the interior of the conveyor unit 400. Each cam 710 and 730 is generally a relatively long rigid member that provides a cam surface accessible from the upwardly directed face of the conveyor unit 400, and which can be contacted by a cam follower member to operate each of the grip assemblies 600. The first cam 710 comprises a front end 712 and a rear end 714, and an outer cam surface 716. Similarly, the second cam 730 comprises a front end 732, a rear end 734, and an outer cam surface 736. The two cams 710 and 730 are preferably oriented parallel with each other, and most preferably generally parallel with the conveyor unit 400. The front ends 712 and 732 of the cams are directed toward the front of the conveyor unit 400.

The cam assembly 700 may also comprise adjustment provisions so that the position of each cam 710 and 730 may be changed with respect to the conveyor unit 400 and/or the grip assemblies 600. The adjustment provisions may also provide for adjusting the position and/or orientation of each cam 710 and 730 relative to each other. Referring to FIGS. 7, 9, and 12–17, and primarily FIGS. 12 and 15, mounted under the second grip bar 650 of the previously described grip assembly 600, are a pair of U-shaped roller brackets 750. Each roller bracket 750 comprises an inner leg 752, an outer leg 754, and a connecting span 756 extending therebetween. The inner leg 752 and the outer leg 754 both preferably extend perpendicularly from the longitudinal axis of the grip bar 650. The connecting span 756 extends from a distal end of the inner leg 752 to a distal end of the outer leg 754, and is preferably oriented parallel with the longitudinal axis of the grip bar 650. Rotatably mounted on the bracket 750, preferably along the connecting span 756, is a cam roller 770. Each cam roller 770 is rotatably supported from the roller bracket 750 by a fastener 774. The cam roller 770 functions as a cam follower and contacts the cam surfaces 716 or 736. One or more apertures 758 are provided in the bracket 750 for mounting the bracket 750 to two grip mounts 660 by use of fasteners 759, as best shown in FIGS. 15 and 16.

Figure 9:
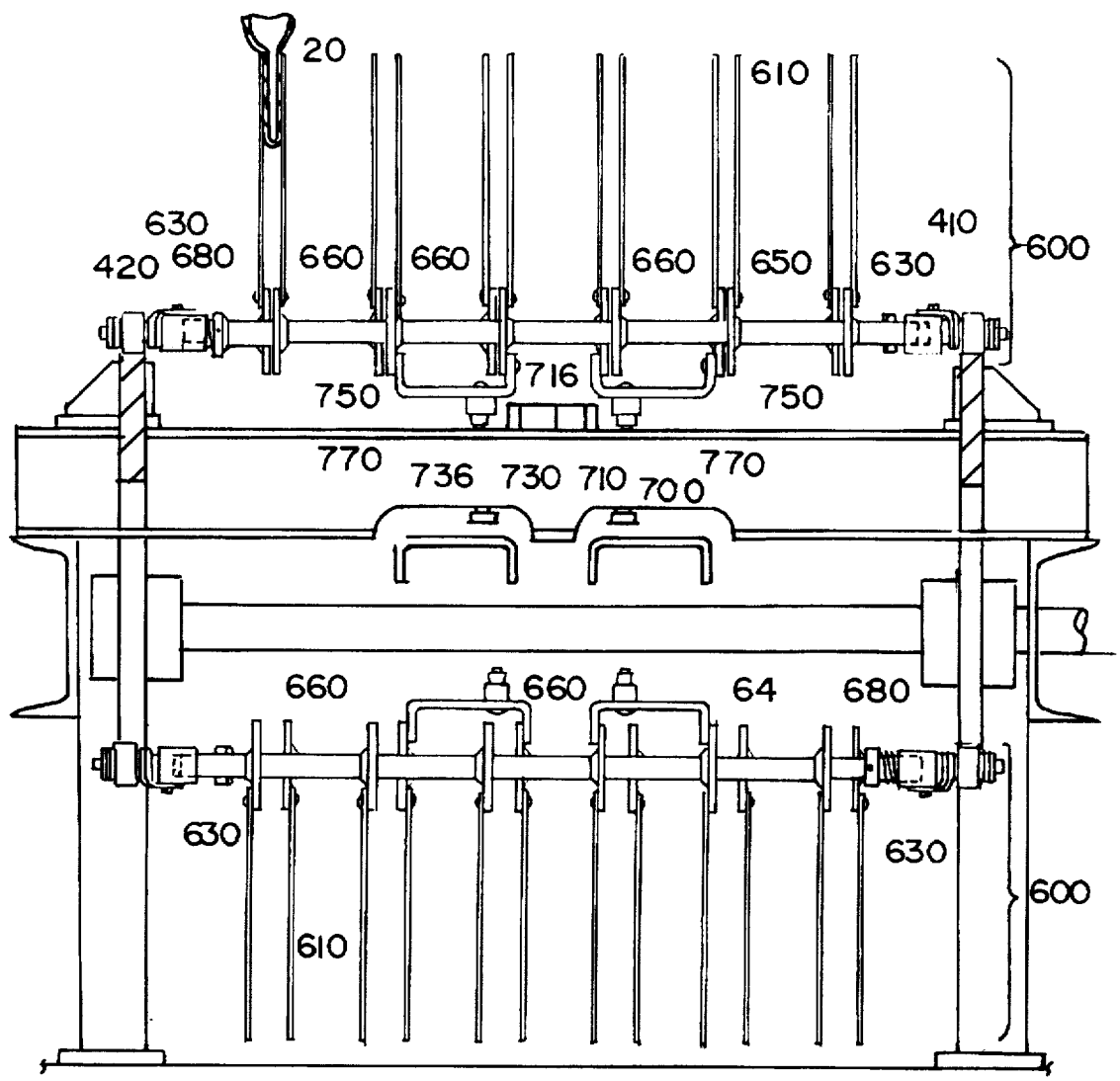
FIG. 9 is a front elevational view of the cam assembly and conveyor unit depicted in FIG. 8.
Figure 10:
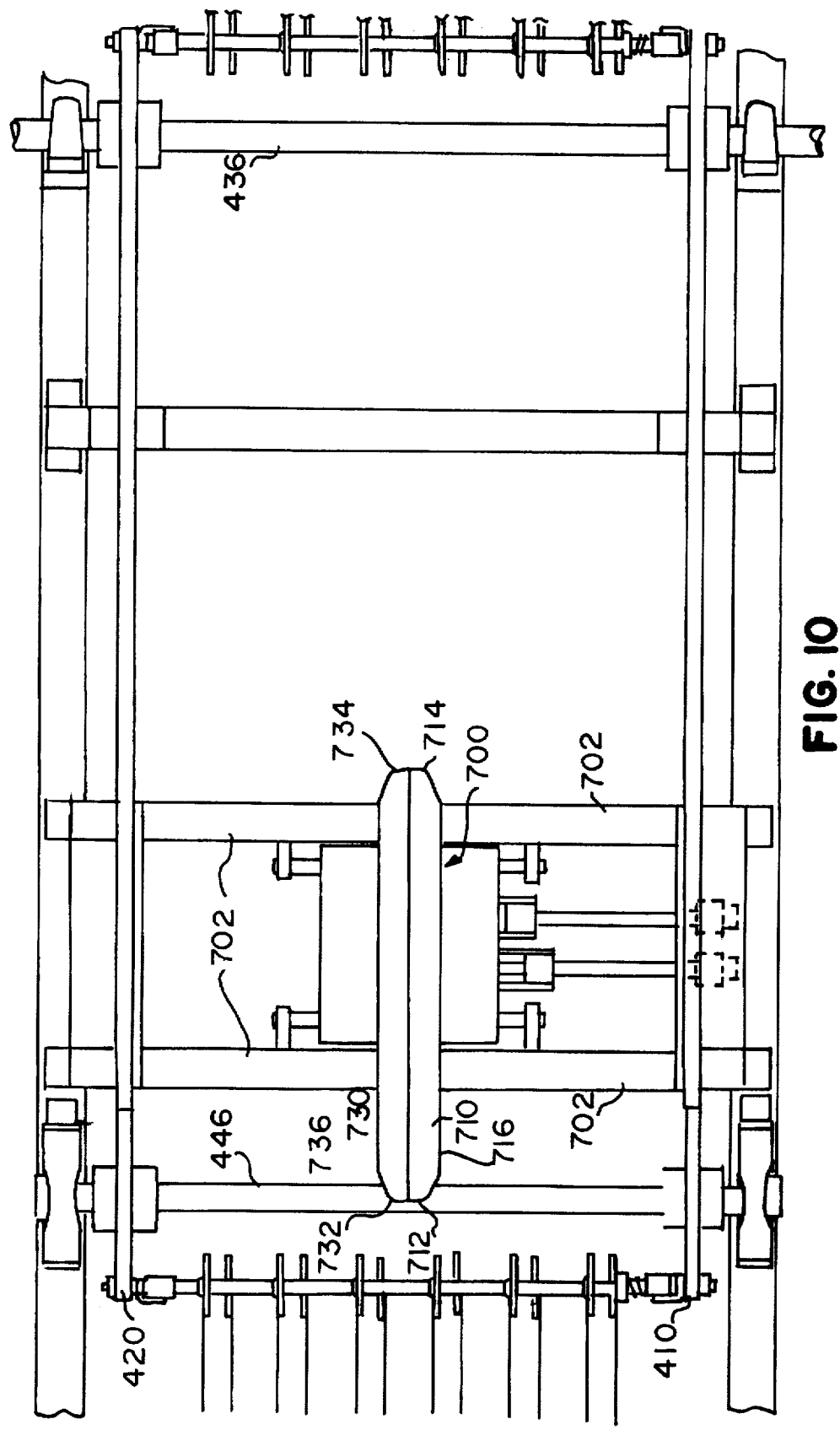
FIG. 10 is a plan view of the cam assembly and conveyor unit depicted in FIG. 8.

Referring to FIG. 9, each roller bracket 750 extends away from the grip assembly 600 a sufficient distance such that a first cam roller 770 may engage the outer cam surface 716 of the first cam 710 and a second corresponding cam roller 770 may engage the outer cam surface 736 of the second cam 730.

Figure 13:
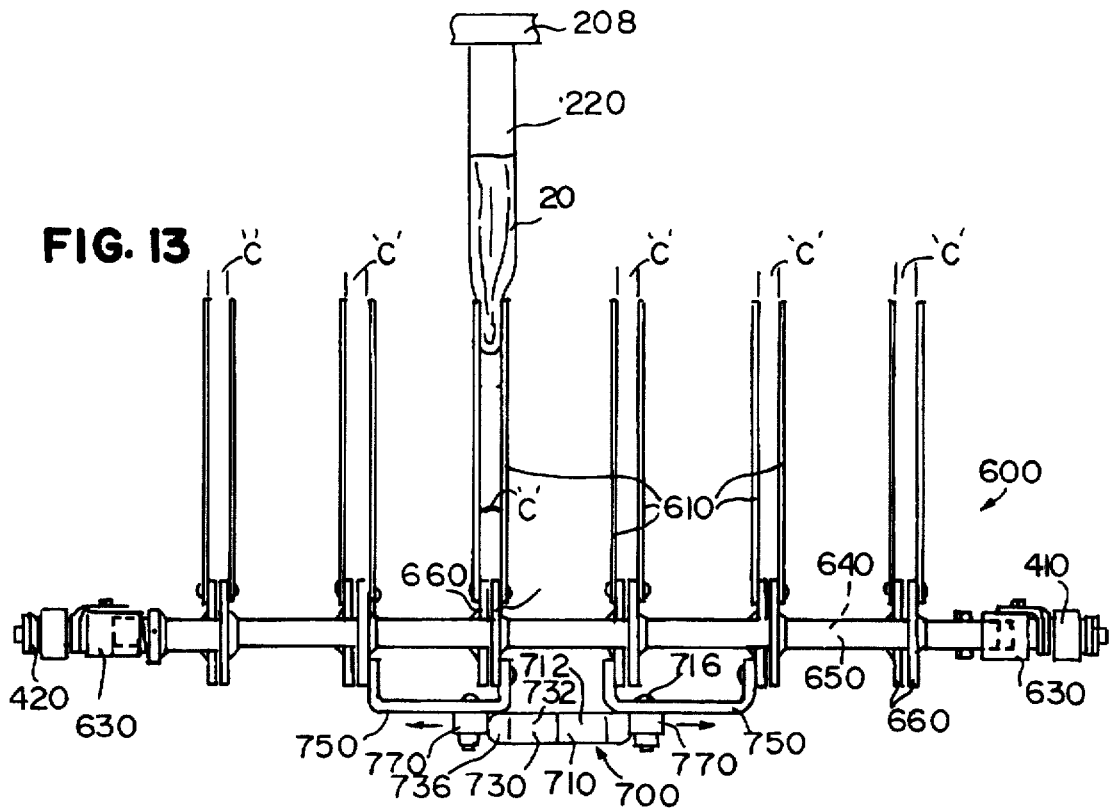
FIG. 13 is a front end view of the grip assembly during its engagement with the cam assembly.
Figure 14:
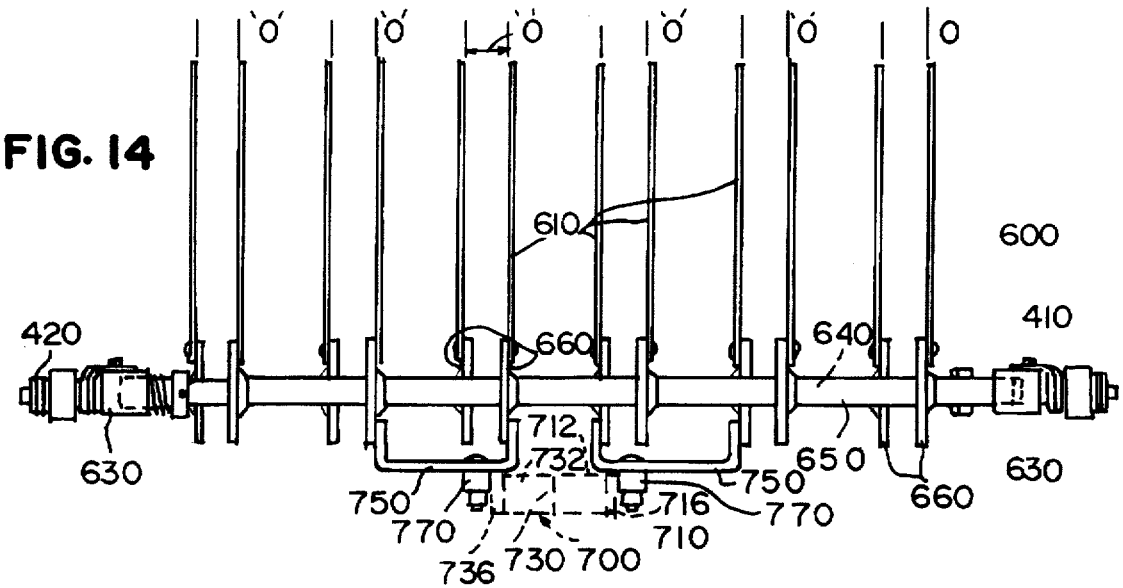
FIG. 14 is a front end view of the grip assembly before and after engagement with the cam assembly.

Referring to FIGS. 13 and 14, as the conveyor unit 400 is operated and the grip assemblies 600 are moved from the front end of the conveyor to the rear end of the conveyor, the cam rollers 770 are brought into contact with the cams 710 and 730 disposed generally within the conveyor unit 400 and below the grip assembly 600. The pair of cam rollers 770 approach the front ends 712 and 732 of the cams 710 and 730 as shown in FIG. 14, and contact the cams along their outer cam surfaces 716 and 736. Before engagement between the cam rollers 770 and the cam surfaces 716 and 736, the grips are "open" or spaced apart from each other by a distance "O" as shown in FIG. 14. The increasing width of each cam 710 and 730, and/or resulting diverging outer cam surfaces 716 and 736, cause the pair of cam rollers 770 to spread apart from one another as shown in FIG. 13. Such lateral movement of the rollers 770 causes axial movement of the grip bars 640 and 650, thereby "closing" pairs of grips 610. At this instant, the grips 610 are brought closer to each other, and spaced a distance "C" as shown in FIG. 13. The distance "C" is less than the distance "O" and is such that the grips 610 contact the article 20 disposed on the form 220.

The location of the cams 710 and 730 along the length of the conveyor 400 or beginning of the region defining the outer cam surfaces 716 and 736 is such that the grips 610 are closed as the grip assembly 600 is brought alongside a plurality of forms 220 extending downward from the header 208 of the form assembly 200.

Figure 11:
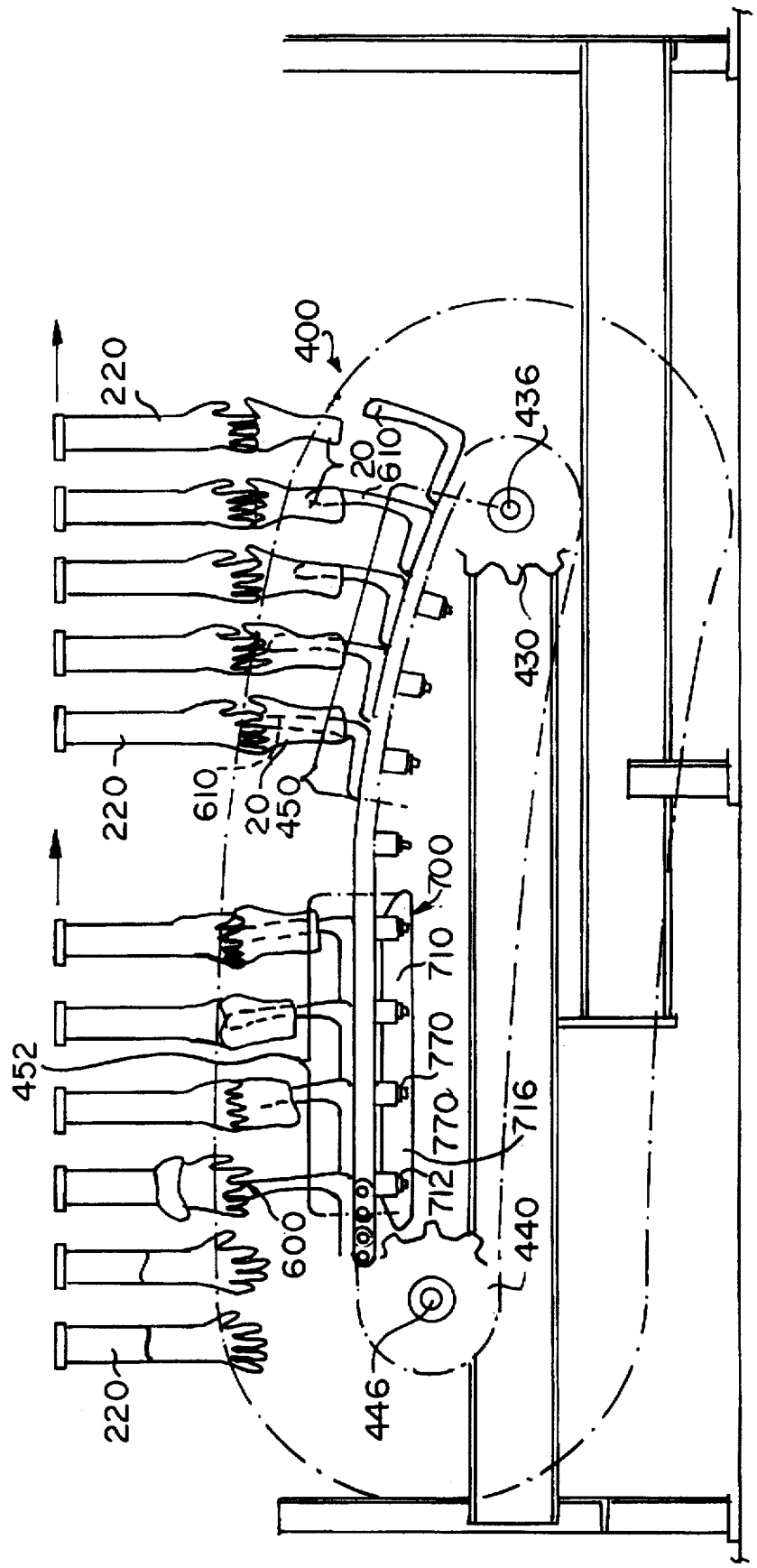
FIG. 11 is a partial side elevational view of the conveyor unit illustrating a plurality of grip assemblies utilized in the preferred embodiment glove stripping machine.

Referring to FIG. 11, the region of engagement between the cams 710 and 730, and the grip assemblies 600 is designated as engagement region 452. The conveyor 400 moves the grip assemblies 600 through this region 452. Concurrent with this, the forms 220 are moved from the front of the conveyor 400, at the left-hand side in FIG. 11, to the rear of the conveyor, and therefore through the cam engagement region 452. As each grip assembly 600 enters the region 452, its respective cam rollers 770 contact and engage the cam assembly 700, specifically along the outer cam surface 716 or 736. As previously explained, this causes closure of respective pairs of grips 610 to the distance "C". Accordingly, the grips 610 contact and engage the forms 220. The grip assemblies 600 and forms 220 continue to move toward the rear of the conveyor 400 and eventually leave the cam engagement region 452. At about this point along the length of the conveyor, the grips 610 begin to spread apart to the distance "O" to facilitate disengagement from the forms 220. As the grip assemblies 600 continue to move toward the rear of the conveyor, they enter the transition region 450 in which the grips 610 are pulled away from the forms 220 thereby removing, or at least partially removing, the molded articles, such as gloves 20, from the forms 220.

Figure 18:
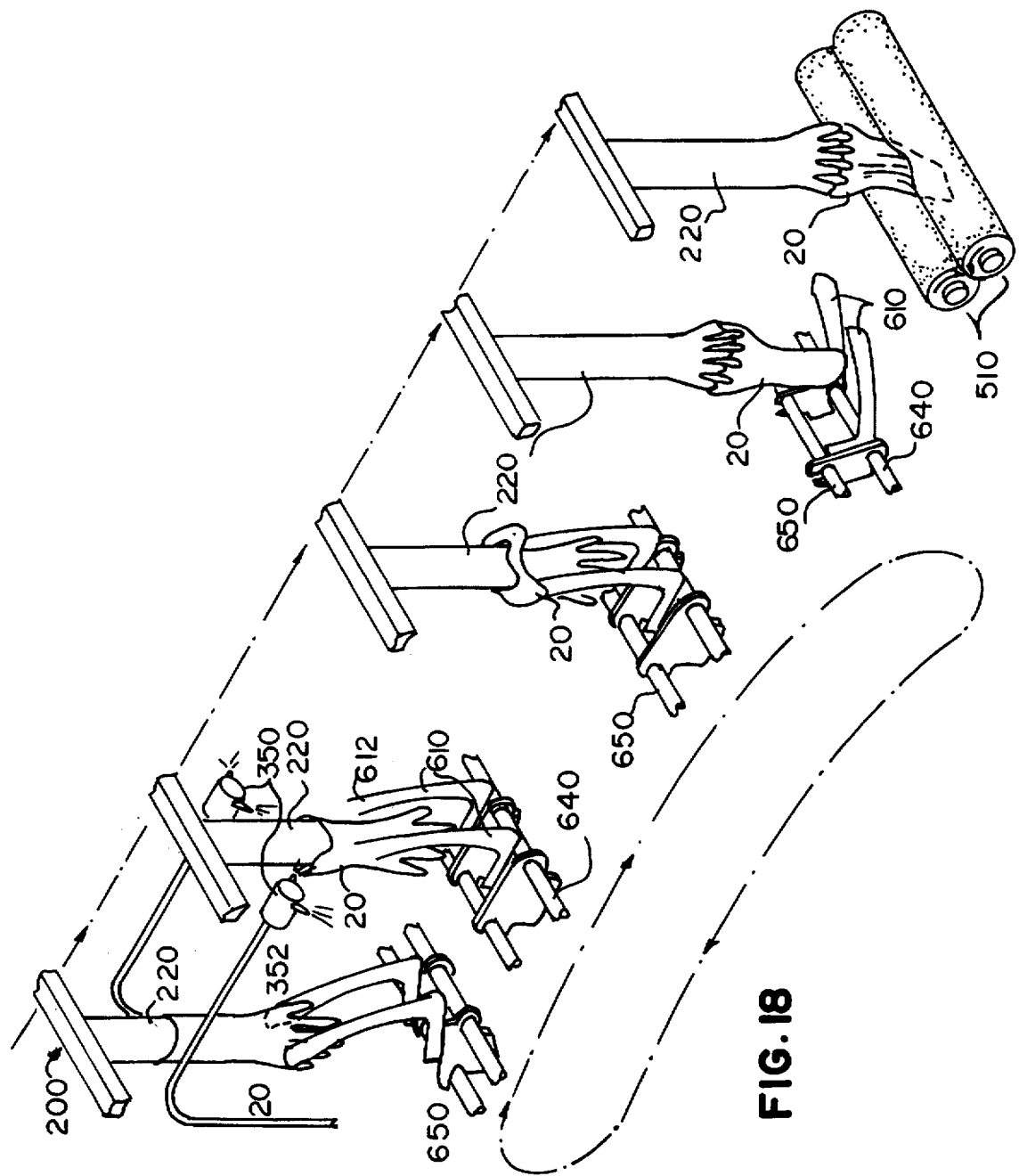
FIG. 18 is a perspective view illustrating the relation between the grip assemblies and the forming molds as the preferred embodiment glove stripping machine is operated to remove molded articles from the forms.
Figure 19:
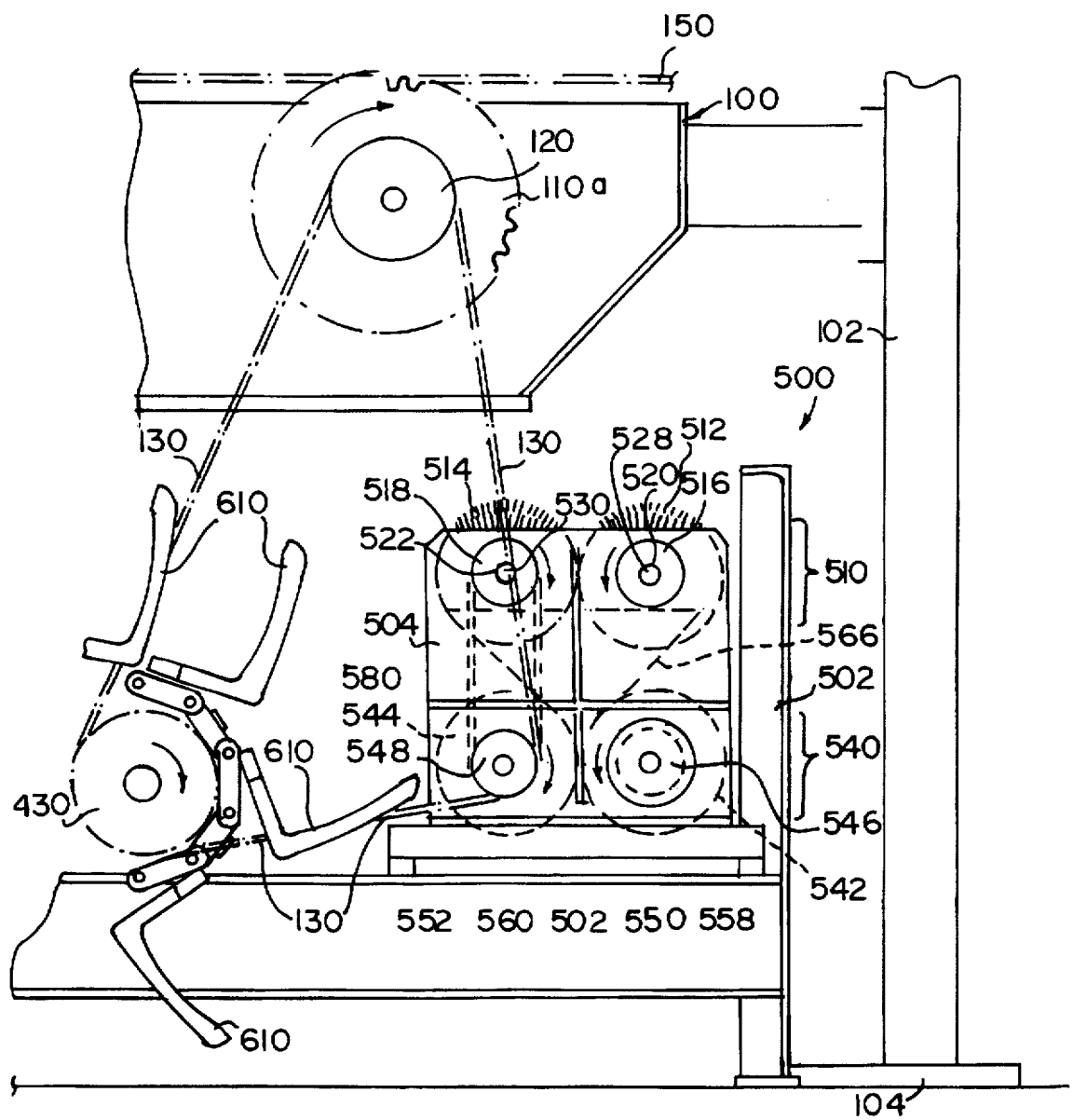
FIG. 19 is a side elevational view of a brush assembly utilized in the preferred embodiment glove stripping machine.

A typical operation utilizing the preferred embodiment glove stripping machine 10 is as follows. Referring to FIGS. 1, 11 and 18, a formed article, such as a dip molded latex glove 20, still residing on its dipping mold or form 220, is brought, along with other formed articles as part of a forming assembly 200, to the forward end of a stripping assembly 50 or 60 by the drive unit 100, and specifically by the master drive chain 150. The forming assembly 200 including the glove 20 is brought alongside the plurality of stationary nozzle blocks 350. The nozzle blowoffs 352 direct pressurized air around the cuff area of the glove 20 and specifically, between the inner surface of the glove 20 and the outer surface of the mold 220, thereby forcing the glove 20 to fold onto itself and away from the mold 220. Just prior to folding onto itself, the gloves 20 are engaged with a pair of grips 610 projecting upward from the grip assembly 600 that is moved underneath and at about the same speed as the form 220 by the conveyor unit 400. Such engagement occurs at about the beginning of the region 452. A pair of grips 610 engage the glove 20 near the knuckles or knuckle portion of the glove 20 in such a manner that the glove 20, in the process of being folded over onto itself at its cuff due to action of the pressurized air, is also folded or at least engaged with the pair of grips 610. Specifically, the glove 20 is folded over each distal end 612 of the pair of grips 610. The rate of travel of the forming assembly 200 is matched with the speed of the conveyor unit 400 so that the pair of grips 610 engaging the glove 20 move at the same speed as the forming assembly 200.

As the form 220 and the glove 20 continue to move over the stripping assemblies 50, 60, the pair of grips 610, having a portion of the glove cuff folded over them, begin to separate from the glove 20 and form 220 as the grip assembly leaves the region 452. Upon exiting this region, the pair of grips 610 further separate from the glove 20 and form 220 primarily due to the effect of the downwardly directed conveyor slope, specifically within the region 450. This causes the glove 20 to be pulled away from the dipping mold 220 at the region of its folded cuff. The grips 610 do not completely remove the glove 20 from the dipping mold 220. The glove 20, still partially hanging from the dipping mold 220, is then passed over the brush set 500. The opposingly rotating top pair of brushes 510 grab the hanging glove 20 from the mold 220 and pull it from its dipping mold 220 downward into the lower pair of brushes 540 which direct the now removed glove 20 onto a conveyor belt or product container.

FIGS. 21 and 22 illustrate the preferred embodiment stripping machine 10 having an optional upper divider frame assembly 80. The frame assembly 80 serves to separate adjacent forms 220 from one another as they travel over a conveyor. The frame assembly 80, when utilized in the previously described stripping machine 10 utilizing a six-wide configuration, comprises seven inverted U-shaped members, each member having two vertical supports 82 and a horizontal dividing member 84.

FIG. 21 illustrates incorporation of three supplemental air distribution systems 300a, 300b, 300c, in addition to the previously described system 300.

It is to be understood that the present invention includes other types of stripping machines or assemblies than the previously described preferred embodiment device 10. Furthermore, it may be desirable depending upon the particular application, to modify the device 10, even significantly. For instance, instead of using the noted drive or component chains and corresponding sprockets, suitable drive belts and appropriate pulleys could be utilized.

While the foregoing details what is felt to be the preferred embodiment of the invention, no material limitations to the scope of the claimed invention is intended. Further, features and design alternatives that would be obvious to one of ordinary skill in the art are considered to be incorporated herein. The scope of the invention as set forth is particularly described in the claims hereinbelow.

What is claimed is:

1. An apparatus for removing an article from a mold having an outer periphery, said article disposed on at least a portion of the outer periphery of said mold, said apparatus comprising:

a conveyor having a forward end, a rearward end, at least one flexible closed loop drive member extending between said forward end and said rearward end, and at least one grip assembly affixed to said closed loop drive member;

said grip assembly comprising at least one pair of outwardly extending grip members adapted for contacting said article on said mold;

a drive unit, said drive unit in operable engagement with said closed loop drive member such that upon activation of said apparatus, said drive unit causes said closed loop drive member to revolve between said forward end and said rearward end of said conveyor thereby effecting movement of said grip assembly from said forward end to said rearward end of said conveyor;

a transport mechanism for moving said mold, said transport mechanism in operable engagement with said drive unit such that upon activation of said apparatus, said mold is moved across said conveyor and is brought into temporary engagement with said pair of grip members of said grip assembly; and a cam assembly adapted for (i) effecting contact between said pair of grip members and said article on said mold as said mold is brought into temporary engagement with said pair of grip members, and (ii) at least partially removing said article from said mold as said mold is brought out of temporary engagement with said pair of grip members.

2. The apparatus of claim 1 wherein said grip assembly further comprises:

a first grip bar;

a second grip bar oriented parallel with said first grip bar; and at least one pair of grip mounts for affixing said at least one pair of grip members to at least one of said first grip bar and said second grip bar.

3. The apparatus of claim 2 wherein said grip assembly further comprises:

at least one grip bar carrier in operable engagement with said at least one flexible closed loop drive member of said conveyor, and having a receptacle portion adapted for engaging and retaining said first grip bar; and a spring and collar assembly disposed at an end of said first grip bar and adapted for coaxially displacing said first grip bar.

4. The apparatus of claim 3 wherein said grip assembly further comprises:

at least one grip bar carrier in operable engagement with said at least one flexible closed loop drive member of said conveyor, and having a receptacle portion adapted for engaging and retaining said second grip bar; and a spring and collar assembly disposed at an end of said second grip bar and adapted for coaxially displacing said second grip bar.

5. The apparatus of claim 2 wherein said grip assembly further comprises:

a roller bracket affixed to one of said first grip bar and said second grip bar; and a cam roller rotatably mounted on said roller bracket, wherein during operation of said apparatus, said cam roller is brought into contact with said cam assembly.

6. The apparatus of claim 1 wherein each said grip member comprises:

a mounting arm segment; and a transversely extending major portion defining a leading edge and a trailing edge.

7. The apparatus of claim 1 wherein said conveyor is oriented such that said forward end is disposed at a height greater than said rearward end.

8. The apparatus of claim 1 wherein said conveyor further has (i) a pair of front sprockets rotatably supported on a first shaft disposed at said forward end of said conveyor, (ii) a pair of rear sprockets rotatably supported on a second shaft disposed at said rearward end of said conveyor, and (iii) said at least one flexible closed loop drive member comprises two drive chains, each extending between a respective front sprocket and a respective rear sprocket.

9. The apparatus of claim 1 further comprising:

a brush set disposed proximate said rearward end of said conveyor, said brush set including at least two rotatable brushes.

10. The apparatus of claim 9 wherein said brush set further includes a drive assembly for rotating at least one of said brushes.

11. The apparatus of claim 10 wherein said drive assembly is in operable engagement with said drive unit such that upon activation of said apparatus, said at least two brushes are rotated in opposite directions.

12. The apparatus of claim 1 further comprising:

a pressurized air distribution system, said system comprising (i) an inlet port for receiving pressurized air, (ii) at least one nozzle blowoff for directing a stream of pressurized air from said system toward said article disposed on said mold, and (iii) at least one conduit for transferring pressurized air from said inlet port to said nozzle blowoff.

13. The apparatus of claim 1 wherein said cam assembly comprises:

a first cam disposed within said conveyor, said first cam oriented such that its longitudinal axis is parallel with the direction of movement of said grip assembly from said forward end to said rearward end of said conveyor, said first cam having an outer cam surface; and a second cam disposed within said conveyor and oriented generally parallel with said first cam.

14. A device for removing a shell molded article from a molding form, said device comprising:

a master drive unit including (i) provisions for moving said molding form and said shell molded article and (ii) a rotary power output;

a closed loop moving chain drive unit including a front rotable shaft, a rear rotatable shaft, and two closed loop chains engaging both front and rear shafts, wherein said moving chain drive unit is in operable engagement with said rotary power output of said master drive unit;

a grip assembly affixed to said at least one closed-loop chain, said grip assemble including (i) at least two grip members extending outward from said chain drive unit and adapted to be moved between said front and rear shafts of said chain drive unit upon activation of said master drive unit, (ii) at least one cam follower; (iii) a first grip bar extending between said two closed-loop chains, (iv) a second grip bar extending between said two closed-loop chains, (v) a first coil spring disposed between one end of said first grip bar and one of said closed-loop chains, and (vi) a second coil spring disposed between one end of said second grip and another of said closed-loop chains;

wherein upon activation of said master drive unit, said grip assembly is moved from said front shaft of said chain drive unit to said rear shaft of said chain drive unit, whereby said at least one cam follower is contacted with said at least one cam surface of said cam thereby effecting displacement of said grip members.

15. The device of claim 14 further comprising:

a brush assembly disposed proximate said rear shaft of said chain drive unit, said brush assembly including at least two oppositely rotating brushes.

16. The device of claim 15 further comprising:

a pressurized air distribution system, said system including (i) an inlet port for receiving pressurized air, (ii) at least one nozzle blowoff for directing a stream of pressurized air from said system toward said article on said mold, and (iii) at least one conduit for transferring pressurized air from said inlet port to said nozzle blowoff.

17. The device of claim 14 wherein said molding form is shaped as a glove.

* * * * *